(12) United States Patent
Gadewar et al.

(10) Patent No.: US 7,883,568 B2
(45) Date of Patent: Feb. 8, 2011

(54) SEPARATION OF LIGHT GASES FROM HALOGENS

(75) Inventors: Sagar B. Gadewar, Goleta, CA (US); Peter K. Stoimenov, Goleta, CA (US); Philip Grosso, Auburn, CA (US); Eric W. McFarland, Santa Barbara, CA (US); Ashley W. Breed, Goleta, CA (US); Michael J. Weiss, Santa Barbara, CA (US); Michael D. Wyrsta, Santa Barbara, CA (US)

(73) Assignee: GRT, Inc., Santa Barbara, CA (US)

( * ) Notice: Subject to any disclaimer, the term of this patent is extended or adjusted under 35 U.S.C. 154(b) by 786 days.

(21) Appl. No.: 11/703,277

(22) Filed: Feb. 5, 2007

(65) Prior Publication Data

US 2007/0251382 A1 Nov. 1, 2007

Related U.S. Application Data

(60) Provisional application No. 60/765,473, filed on Feb. 3, 2006.

(51) Int. Cl.
*B01D 53/02* (2006.01)
(52) U.S. Cl. .................. 95/131; 95/132; 423/240 R; 423/240 S; 423/241
(58) Field of Classification Search .................. 95/39, 95/91, 131, 266; 423/210, 213.2, 215, 239.1, 423/239.2, 240, 240 R, 240 S, 241, 244.03, 423/244.04, 244.06, 244.11, 247, 700, 714, 423/715
See application file for complete search history.

(56) References Cited

U.S. PATENT DOCUMENTS

| 2,168,260 A | 8/1939 | Heisel et al. |
| 2,246,082 A | 6/1941 | Vaughan et al. |
| 2,488,083 A | 11/1949 | Gorin et al. |

(Continued)

FOREIGN PATENT DOCUMENTS

BR 0210054 8/2004

(Continued)

OTHER PUBLICATIONS

U.S. Appl. No. 60/487,364, filed Jul. 15, 2003, Lorkovic et al.

(Continued)

*Primary Examiner*—Duane Smith
*Assistant Examiner*—Thomas Bennett McKenzie
(74) *Attorney, Agent, or Firm*—Baker Botts L. L.P.

(57) ABSTRACT

A process is provided for separating one or more light gases from bromine or chlorine using one or more physical separations and contact with a chemical scrubber to recover additional halogen. In one aspect, the process comprises (a) providing a feed of halogen containing one or more light gases to a distillation column or flash vaporizer; (b) operating the distillation column or flash vaporizer to separate the feed into (i) a first liquid containing a major amount of halogen and no more than a minor amount of light gas(es), and (ii) a first vapor containing a major amount of light gas(es) and no more than a minor amount of halogen; and (c) providing the vapor to a chemical scrubber to recover halogen from the vapor.

20 Claims, 6 Drawing Sheets

U.S. PATENT DOCUMENTS

| | | |
|---|---|---|
| 2,677,598 A | 5/1954 | Crummett et al. |
| 2,941,014 A | 6/1960 | Rothweiler et al. |
| 3,029,575 A * | 4/1962 | Eng et al. ..................... 95/132 |
| 3,076,784 A | 2/1963 | Huermann et al. |
| 3,172,915 A | 3/1965 | Borkowski et al. |
| 3,246,043 A | 4/1966 | Rosset et al. |
| 3,273,964 A | 9/1966 | Rosset |
| 3,294,846 A | 12/1966 | Livak et al. |
| 3,310,380 A * | 3/1967 | Lester ......................... 423/502 |
| 3,346,340 A | 10/1967 | Louvar et al. |
| 3,353,916 A | 11/1967 | Lester |
| 3,353,919 A | 11/1967 | Stockman |
| 3,496,242 A | 2/1970 | Berkowitz et al. |
| 3,562,321 A | 2/1971 | Borkowski et al. |
| 3,598,876 A | 8/1971 | Bloch |
| 3,657,367 A | 4/1972 | Blake et al. |
| 3,670,037 A | 6/1972 | Dugan |
| 3,673,264 A | 6/1972 | Kuhn |
| 3,679,758 A | 7/1972 | Schneider |
| 3,702,886 A | 11/1972 | Argauer et al. |
| 3,705,196 A | 12/1972 | Turner |
| 3,799,997 A | 3/1974 | Schmerling |
| 3,865,886 A | 2/1975 | Schindler et al. |
| 3,875,293 A * | 4/1975 | Davis ......................... 423/481 |
| 3,876,715 A * | 4/1975 | McNulty et al. ............ 570/252 |
| 3,879,473 A | 4/1975 | Stapp |
| 3,879,480 A | 4/1975 | Riegel et al. |
| 3,883,651 A | 5/1975 | Woitun et al. |
| 3,886,287 A | 5/1975 | Kobayashi et al. |
| 3,894,103 A | 7/1975 | Chang et al. |
| 3,894,104 A | 7/1975 | Chang et al. |
| 3,894,105 A | 7/1975 | Chang et al. |
| 3,894,107 A | 7/1975 | Butter et al. |
| 3,907,917 A | 9/1975 | Forth |
| 3,919,336 A | 11/1975 | Kurtz |
| 3,920,764 A | 11/1975 | Riegel et al. |
| 3,923,913 A | 12/1975 | Antonini et al. |
| 3,928,483 A | 12/1975 | Chang et al. |
| 3,965,205 A | 6/1976 | Garwood et al. |
| 3,974,062 A | 8/1976 | Owen et al. |
| 3,987,119 A | 10/1976 | Kurtz et al. |
| 3,992,466 A | 11/1976 | Plank et al. |
| 4,006,169 A | 2/1977 | Anderson et al. |
| 4,011,278 A | 3/1977 | Plank et al. |
| 4,025,571 A | 5/1977 | Lago |
| 4,025,572 A | 5/1977 | Lago |
| 4,025,575 A | 5/1977 | Chang et al. |
| 4,025,576 A | 5/1977 | Chang et al. |
| 4,035,285 A | 7/1977 | Owen et al. |
| 4,035,430 A | 7/1977 | Dwyer et al. |
| 4,039,600 A | 8/1977 | Chang |
| 4,044,061 A | 8/1977 | Chang et al. |
| 4,046,825 A | 9/1977 | Owen et al. |
| 4,049,734 A | 9/1977 | Garwood et al. |
| 4,052,471 A | 10/1977 | Pearsall |
| 4,052,472 A | 10/1977 | Givens et al. |
| 4,058,576 A | 11/1977 | Chang et al. |
| 4,060,568 A | 11/1977 | Rodewald |
| 4,071,753 A | 1/1978 | Fulenwider et al. |
| 4,072,733 A | 2/1978 | Hargis et al. |
| 4,087,475 A | 5/1978 | Jordan |
| 4,088,706 A | 5/1978 | Kaeding |
| 4,092,368 A | 5/1978 | Smith |
| 4,110,180 A | 8/1978 | Nidola et al. |
| 4,117,251 A | 9/1978 | Kaufhold et al. |
| 4,129,604 A | 12/1978 | Tsao |
| 4,133,838 A | 1/1979 | Pearson |
| 4,133,966 A | 1/1979 | Pretzer et al. |
| 4,138,440 A | 2/1979 | Chang et al. |
| 4,156,698 A | 5/1979 | Dwyer et al. |
| 4,169,862 A | 10/1979 | Eden |
| 4,172,099 A | 10/1979 | Severino |
| 4,187,255 A | 2/1980 | Dodd |
| 4,194,990 A | 3/1980 | Pieters et al. |
| 4,197,420 A | 4/1980 | Ferraris et al. |
| 4,219,680 A | 8/1980 | Konig et al. |
| 4,249,031 A | 2/1981 | Drent et al. |
| 4,270,929 A | 6/1981 | Dang Vu et al. |
| 4,272,338 A | 6/1981 | Lynch et al. |
| 4,282,159 A | 8/1981 | Davidson et al. |
| 4,300,005 A | 11/1981 | Li |
| 4,300,009 A | 11/1981 | Haag et al. |
| 4,301,253 A | 11/1981 | Warren |
| 4,302,619 A | 11/1981 | Gross et al. |
| 4,307,261 A | 12/1981 | Beard, Jr. et al. |
| 4,308,403 A | 12/1981 | Knifton |
| 4,311,865 A | 1/1982 | Chen et al. |
| 4,317,800 A | 3/1982 | Sloterdijk et al. |
| 4,317,934 A | 3/1982 | Seemuth |
| 4,317,943 A | 3/1982 | Knifton |
| 4,320,241 A | 3/1982 | Frankiewicz |
| 4,333,852 A | 6/1982 | Warren |
| 4,347,391 A | 8/1982 | Campbell |
| 4,350,511 A | 9/1982 | Holmes et al. |
| 4,371,716 A | 2/1983 | Paxson et al. |
| 4,373,109 A | 2/1983 | Olah |
| 4,376,019 A | 3/1983 | Gamlen et al. |
| 4,380,682 A | 4/1983 | Leitert et al. |
| 4,384,159 A | 5/1983 | Diesen |
| 4,389,391 A | 6/1983 | Dunn |
| 4,410,714 A | 10/1983 | Apanel |
| 4,412,086 A | 10/1983 | Beard, Jr. et al. |
| 4,418,236 A | 11/1983 | Cornelius et al. |
| 4,431,856 A | 2/1984 | Daviduk et al. |
| 4,433,189 A | 2/1984 | Young |
| 4,433,192 A | 2/1984 | Olah |
| 4,439,409 A | 3/1984 | Puppe et al. |
| 4,440,871 A | 4/1984 | Lok et al. |
| 4,443,620 A | 4/1984 | Gelbein et al. |
| 4,462,814 A | 7/1984 | Holmes et al. |
| 4,465,884 A | 8/1984 | Degnan et al. |
| 4,465,893 A | 8/1984 | Olah |
| 4,467,130 A | 8/1984 | Olah |
| 4,467,133 A | 8/1984 | Chang et al. |
| 4,489,210 A | 12/1984 | Judat et al. |
| 4,489,211 A | 12/1984 | Ogura et al. |
| 4,492,657 A | 1/1985 | Heiss |
| 4,496,752 A | 1/1985 | Gelbein et al. |
| 4,497,967 A | 2/1985 | Wan |
| 4,499,314 A | 2/1985 | Seddon et al. |
| 4,506,105 A | 3/1985 | Kaufhold |
| 4,509,955 A | 4/1985 | Hayashi |
| 4,513,092 A | 4/1985 | Chu et al. |
| 4,513,164 A | 4/1985 | Olah |
| 4,523,040 A | 6/1985 | Olah |
| 4,524,227 A | 6/1985 | Fowles et al. |
| 4,524,228 A | 6/1985 | Fowles et al. |
| 4,524,231 A | 6/1985 | Fowles et al. |
| 4,538,014 A | 8/1985 | Miale et al. |
| 4,538,015 A | 8/1985 | Miale et al. |
| 4,540,826 A | 9/1985 | Banasiak et al. |
| 4,543,434 A | 9/1985 | Chang |
| 4,544,781 A | 10/1985 | Chao et al. |
| 4,547,612 A | 10/1985 | Tabak |
| 4,550,217 A | 10/1985 | Graziani et al. |
| 4,550,218 A | 10/1985 | Chu |
| 4,568,660 A | 2/1986 | Klosiewicz |
| 4,579,977 A | 4/1986 | Drake |
| 4,579,992 A | 4/1986 | Kaufhold et al. |
| 4,579,996 A | 4/1986 | Font Freide et al. |
| 4,587,375 A | 5/1986 | Debras et al. |
| 4,588,835 A | 5/1986 | Torii et al. |
| 4,590,310 A | 5/1986 | Townsend et al. |
| 4,599,474 A | 7/1986 | Devries et al. |

| | | | | | |
|---|---|---|---|---|---|
| 4,605,796 A | 8/1986 | Isogai et al. | 4,982,041 A | 1/1991 | Campbell |
| 4,605,803 A | 8/1986 | Chang et al. | 4,988,660 A | 1/1991 | Campbell |
| 4,621,161 A | 11/1986 | Shihabi | 4,990,696 A | 2/1991 | Stauffer |
| 4,621,164 A | 11/1986 | Chang et al. | 4,990,711 A | 2/1991 | Chen et al. |
| 4,633,027 A | 12/1986 | Owen et al. | 5,001,293 A | 3/1991 | Nubel et al. |
| 4,634,800 A | 1/1987 | Withers, Jr. et al. | 5,004,847 A | 4/1991 | Beaver et al. |
| 4,642,403 A | 2/1987 | Hyde et al. | 5,013,424 A | 5/1991 | James, Jr. et al. |
| 4,642,404 A | 2/1987 | Shihabi | 5,013,793 A | 5/1991 | Wang et al. |
| 4,652,688 A | 3/1987 | Brophy et al. | 5,019,652 A | 5/1991 | Taylor et al. |
| 4,654,449 A | 3/1987 | Chang et al. | 5,026,934 A | 6/1991 | Bains et al. |
| 4,655,893 A | 4/1987 | Beale | 5,026,937 A | 6/1991 | Bricker |
| 4,658,073 A | 4/1987 | Tabak | 5,026,944 A | 6/1991 | Allenger et al. |
| 4,658,077 A | 4/1987 | Kolts et al. | 5,034,566 A | 7/1991 | Ishino et al. |
| 4,665,259 A | 5/1987 | Brazdil et al. | 5,043,502 A | 8/1991 | Martindale et al. |
| 4,665,267 A | 5/1987 | Barri | 5,055,235 A | 10/1991 | Brackenridge et al. |
| 4,665,270 A | 5/1987 | Brophy et al. | 5,055,633 A | 10/1991 | Volles |
| 4,675,410 A | 6/1987 | Feitler et al. | 5,055,634 A | 10/1991 | Volles |
| 4,690,903 A | 9/1987 | Chen et al. | 5,059,744 A | 10/1991 | Harandi et al. |
| 4,695,663 A | 9/1987 | Hall et al. | 5,068,478 A | 11/1991 | Miller et al. |
| 4,696,985 A | 9/1987 | Martin | 5,071,449 A | 12/1991 | Sircar |
| 4,704,488 A | 11/1987 | Devries et al. | 5,071,815 A | 12/1991 | Wallace |
| 4,704,493 A | 11/1987 | Devries et al. | 5,073,656 A | 12/1991 | Chafin et al. |
| 4,709,108 A | 11/1987 | Devries et al. | 5,073,657 A | 12/1991 | Warren |
| 4,720,600 A | 1/1988 | Beech, Jr. et al. | 5,082,473 A | 1/1992 | Keefer |
| 4,720,602 A | 1/1988 | Chu | 5,082,816 A | 1/1992 | Teller et al. |
| 4,724,275 A | 2/1988 | Hinnenkamp et al. | 5,085,674 A | 2/1992 | Leavitt |
| 4,735,747 A | 4/1988 | Ollivier et al. | 5,087,779 A | 2/1992 | Nubel et al. |
| 4,737,594 A | 4/1988 | Olah | 5,087,786 A | 2/1992 | Nubel et al. |
| 4,748,013 A * | 5/1988 | Saito et al. .................. 423/241 | 5,087,787 A | 2/1992 | Kimble et al. |
| 4,769,504 A | 9/1988 | Noceti et al. | 5,093,542 A | 3/1992 | Gaffney |
| 4,774,216 A | 9/1988 | Kolts et al. | 5,096,469 A | 3/1992 | Keefer |
| 4,775,462 A | 10/1988 | Imai et al. | 5,097,083 A | 3/1992 | Stauffer |
| 4,777,321 A | 10/1988 | Harandi et al. | 5,099,084 A | 3/1992 | Stauffer |
| 4,781,733 A | 11/1988 | Babcock et al. | 5,105,045 A | 4/1992 | Kimble et al. |
| 4,783,566 A | 11/1988 | Kocal et al. | 5,105,046 A | 4/1992 | Washecheck |
| 4,788,369 A | 11/1988 | Marsh et al. | 5,107,032 A | 4/1992 | Erb et al. |
| 4,788,377 A | 11/1988 | Chang et al. | 5,107,051 A | 4/1992 | Pannell |
| 4,792,642 A | 12/1988 | Rule et al. | 5,107,061 A | 4/1992 | Ou et al. |
| 4,795,732 A | 1/1989 | Barri | 5,108,579 A | 4/1992 | Casci |
| 4,795,737 A | 1/1989 | Rule et al. | 5,118,899 A | 6/1992 | Kimble et al. |
| 4,795,843 A | 1/1989 | Imai et al. | 5,120,332 A | 6/1992 | Wells |
| 4,795,848 A | 1/1989 | Teller et al. | 5,132,343 A | 7/1992 | Zwecker et al. |
| 4,804,797 A | 2/1989 | Minet et al. | 5,138,112 A | 8/1992 | Gosling et al. |
| 4,804,800 A | 2/1989 | Bortinger et al. | 5,139,991 A | 8/1992 | Taylor et al. |
| 4,808,763 A | 2/1989 | Shum | 5,146,027 A | 9/1992 | Gaffney |
| 4,814,527 A | 3/1989 | Diesen | 5,157,189 A | 10/1992 | Karra |
| 4,814,532 A | 3/1989 | Yoshida et al. | 5,160,502 A | 11/1992 | Kimble et al. |
| 4,814,535 A | 3/1989 | Yurchak | 5,166,452 A | 11/1992 | Gradl et al. |
| 4,814,536 A | 3/1989 | Yurchak | 5,175,382 A | 12/1992 | Hebgen et al. |
| 4,849,562 A | 7/1989 | Buhs et al. | 5,178,748 A | 1/1993 | Casci et al. |
| 4,849,573 A | 7/1989 | Kaeding | 5,185,479 A | 2/1993 | Stauffer |
| 4,851,602 A | 7/1989 | Harandi et al. | 5,188,725 A | 2/1993 | Harandi |
| 4,851,606 A | 7/1989 | Ragonese et al. | 5,191,142 A | 3/1993 | Marshall et al. |
| 4,886,925 A | 12/1989 | Harandi | 5,194,244 A | 3/1993 | Brownscombe et al. |
| 4,886,932 A | 12/1989 | Leyshon | 5,202,506 A | 4/1993 | Kirchner et al. |
| 4,891,463 A | 1/1990 | Chu | 5,202,511 A | 4/1993 | Salinas, III et al. |
| 4,895,995 A | 1/1990 | James, Jr. et al. | 5,210,357 A | 5/1993 | Kolts et al. |
| 4,899,000 A | 2/1990 | Stauffer | 5,215,648 A | 6/1993 | Zones et al. |
| 4,899,001 A | 2/1990 | Kalnes et al. | 5,223,471 A | 6/1993 | Washecheck |
| 4,899,002 A | 2/1990 | Harandi et al. | 5,228,888 A | 7/1993 | Gmelin et al. |
| 4,902,842 A | 2/1990 | Kalnes et al. | 5,233,113 A | 8/1993 | Periana et al. |
| 4,925,995 A | 5/1990 | Robschlager | 5,237,115 A | 8/1993 | Makovec et al. |
| 4,929,781 A | 5/1990 | James, Jr. et al. | 5,243,098 A | 9/1993 | Miller et al. |
| 4,939,310 A | 7/1990 | Wade | 5,243,114 A | 9/1993 | Johnson et al. |
| 4,939,311 A | 7/1990 | Washecheck et al. | 5,245,109 A | 9/1993 | Kaminsky et al. |
| 4,945,175 A | 7/1990 | Hobbs et al. | 5,254,323 A * | 10/1993 | Itoh et al. .................. 423/241 |
| 4,950,811 A | 8/1990 | Doussain et al. | 5,254,772 A | 10/1993 | Dukat et al. |
| 4,950,822 A | 8/1990 | Dileo et al. | 5,254,790 A | 10/1993 | Thomas et al. |
| 4,956,521 A | 9/1990 | Volles | 5,264,635 A | 11/1993 | Le et al. |
| 4,962,252 A | 10/1990 | Wade | 5,268,518 A | 12/1993 | West et al. |
| 4,973,776 A | 11/1990 | Allenger et al. | 5,276,226 A | 1/1994 | Horvath et al. |
| 4,973,786 A | 11/1990 | Karra | 5,276,240 A | 1/1994 | Timmons et al. |
| 4,982,024 A | 1/1991 | Lin et al. | 5,276,242 A | 1/1994 | Wu |

| | | | | | | |
|---|---|---|---|---|---|---|
| 5,284,990 A | 2/1994 | Peterson et al. | | 5,728,897 A | 3/1998 | Buysch et al. |
| 5,300,126 A | 4/1994 | Brown et al. | | 5,728,905 A | 3/1998 | Clegg et al. |
| 5,302,187 A * | 4/1994 | Itoh et al. ............... 95/11 | | 5,734,073 A | 3/1998 | Chambers et al. |
| 5,306,855 A | 4/1994 | Periana et al. | | 5,741,949 A | 4/1998 | Mack |
| 5,316,995 A | 5/1994 | Kaminsky et al. | | 5,744,669 A | 4/1998 | Kalnes et al. |
| 5,319,132 A | 6/1994 | Ozawa et al. | | 5,750,801 A | 5/1998 | Buysch et al. |
| 5,334,777 A | 8/1994 | Miller et al. | | 5,770,175 A | 6/1998 | Zones |
| 5,345,021 A | 9/1994 | Casci et al. | | 5,776,871 A | 7/1998 | Cothran et al. |
| 5,354,916 A | 10/1994 | Horvath et al. | | 5,780,703 A | 7/1998 | Chang et al. |
| 5,354,931 A | 10/1994 | Jan et al. | | 5,788,243 A * | 8/1998 | Harshaw et al. ............ 273/363 |
| 5,366,949 A | 11/1994 | Schubert | | 5,798,314 A | 8/1998 | Spencer et al. |
| 5,371,313 A | 12/1994 | Ostrowicki | | 5,814,715 A | 9/1998 | Chen et al. |
| 5,376,164 A * | 12/1994 | Zarchy et al. ............... 95/41 | | 5,817,904 A | 10/1998 | Vic et al. |
| 5,382,704 A | 1/1995 | Krespan et al. | | 5,821,394 A | 10/1998 | Schoebrechts et al. |
| 5,382,743 A | 1/1995 | Beech, Jr. et al. | | 5,847,224 A | 12/1998 | Koga et al. |
| 5,382,744 A | 1/1995 | Abbott et al. | | 5,849,978 A | 12/1998 | Benazzi et al. |
| 5,385,718 A | 1/1995 | Casci et al. | | 5,866,735 A | 2/1999 | Cheung et al. |
| 5,395,981 A | 3/1995 | Marker | | 5,895,831 A | 4/1999 | Brasier et al. |
| 5,399,258 A | 3/1995 | Fletcher et al. | | 5,898,086 A | 4/1999 | Harris |
| 5,401,890 A | 3/1995 | Parks | | 5,905,169 A | 5/1999 | Jacobson |
| 5,401,894 A | 3/1995 | Brasier et al. | | 5,906,892 A | 5/1999 | Thompson et al. |
| 5,406,017 A | 4/1995 | Withers, Jr. | | 5,908,963 A | 6/1999 | Voss et al. |
| 5,414,173 A | 5/1995 | Garces et al. | | 5,952,538 A | 9/1999 | Vaughn et al. |
| 5,430,210 A | 7/1995 | Grasselli et al. | | 5,959,170 A | 9/1999 | Withers |
| 5,430,214 A | 7/1995 | Smith et al. | | 5,968,236 A | 10/1999 | Bassine |
| 5,430,219 A | 7/1995 | Sanfilippo et al. | | 5,969,195 A | 10/1999 | Stabel et al. |
| 5,436,378 A | 7/1995 | Masini et al. | | 5,977,402 A | 11/1999 | Sekiguchi et al. |
| 5,444,168 A | 8/1995 | Brown | | 5,983,476 A | 11/1999 | Eshelman et al. |
| 5,446,234 A | 8/1995 | Casci et al. | | 5,986,158 A | 11/1999 | Van Broekhoven et al. |
| 5,453,557 A | 9/1995 | Harley et al. | | 5,994,604 A | 11/1999 | Reagen et al. |
| 5,456,822 A | 10/1995 | Marcilly et al. | | 5,998,679 A | 12/1999 | Miller |
| 5,457,255 A | 10/1995 | Kumata et al. | | 5,998,686 A | 12/1999 | Clem et al. |
| 5,464,799 A | 11/1995 | Casci et al. | | 6,002,059 A | 12/1999 | Hellring et al. |
| 5,465,699 A | 11/1995 | Voigt | | 6,015,867 A | 1/2000 | Fushimi et al. |
| 5,470,377 A | 11/1995 | Whitlock | | 6,018,088 A | 1/2000 | Olah |
| 5,480,629 A | 1/1996 | Thompson et al. | | 6,022,929 A | 2/2000 | Chen et al. |
| 5,486,627 A | 1/1996 | Quarderer et al. | | 6,034,288 A | 3/2000 | Scott et al. |
| 5,489,719 A | 2/1996 | Le et al. | | 6,056,804 A | 5/2000 | Keefer et al. |
| 5,489,727 A | 2/1996 | Randolph et al. | | 6,068,679 A | 5/2000 | Zheng |
| 5,500,297 A | 3/1996 | Thompson et al. | | 6,072,091 A | 6/2000 | Cosyns et al. |
| 5,510,525 A | 4/1996 | Sen et al. | | 6,087,294 A | 7/2000 | Klabunde et al. |
| 5,523,503 A | 6/1996 | Funk et al. | | 6,090,312 A | 7/2000 | Ziaka et al. |
| 5,525,230 A | 6/1996 | Wrigley et al. | | 6,096,932 A | 8/2000 | Subramanian |
| 5,538,540 A | 7/1996 | Whitlock | | 6,096,933 A | 8/2000 | Cheung et al. |
| 5,563,313 A | 10/1996 | Chung et al. | | 6,103,215 A | 8/2000 | Zones et al. |
| 5,565,092 A | 10/1996 | Pannell et al. | | 6,107,561 A | 8/2000 | Thompson |
| 5,565,616 A | 10/1996 | Li et al. | | 6,117,371 A | 9/2000 | Mack |
| 5,571,762 A | 11/1996 | Clerici et al. | | 6,124,514 A | 9/2000 | Emmrich et al. |
| 5,571,885 A | 11/1996 | Chung et al. | | 6,127,588 A | 10/2000 | Kimble et al. |
| 5,599,381 A | 2/1997 | Whitlock | | 6,130,260 A | 10/2000 | Hall et al. |
| 5,600,043 A | 2/1997 | Johnston et al. | | 6,143,939 A | 11/2000 | Farcasiu et al. |
| 5,600,045 A | 2/1997 | Van Der Aalst et al. | | 6,169,218 B1 | 1/2001 | Hearn et al. |
| 5,609,654 A | 3/1997 | Le et al. | | 6,180,841 B1 | 1/2001 | Fatutto et al. |
| 5,633,419 A | 5/1997 | Spencer et al. | | 6,187,871 B1 | 2/2001 | Thompson et al. |
| 5,639,930 A | 6/1997 | Penick | | 6,187,983 B1 | 2/2001 | Sun |
| 5,653,956 A | 8/1997 | Zones | | 6,203,712 B1 | 3/2001 | Bronner et al. |
| 5,656,149 A | 8/1997 | Zones et al. | | 6,207,864 B1 | 3/2001 | Henningsen et al. |
| 5,661,097 A | 8/1997 | Spencer et al. | | 6,225,517 B1 | 5/2001 | Nascimento et al. |
| 5,663,465 A | 9/1997 | Clegg et al. | | 6,248,218 B1 | 6/2001 | Linkous et al. |
| 5,663,474 A | 9/1997 | Pham et al. | | 6,265,505 B1 | 7/2001 | McConville et al. |
| 5,675,046 A | 10/1997 | Ohno et al. | | 6,281,405 B1 | 8/2001 | Davis et al. |
| 5,675,052 A | 10/1997 | Menon et al. | | 6,320,085 B1 | 11/2001 | Arvai et al. |
| 5,679,134 A | 10/1997 | Brugerolle et al. | | 6,337,063 B1 | 1/2002 | Rouleau et al. |
| 5,679,879 A | 10/1997 | Mercier et al. | | 6,342,200 B1 | 1/2002 | Rouleau et al. |
| 5,684,213 A | 11/1997 | Nemphos et al. | | 6,368,490 B1 | 4/2002 | Gestermann |
| 5,693,191 A | 12/1997 | Pividal et al. | | 6,369,283 B1 | 4/2002 | Guram et al. |
| 5,695,890 A | 12/1997 | Thompson et al. | | 6,372,949 B1 | 4/2002 | Brown et al. |
| 5,698,747 A | 12/1997 | Godwin et al. | | 6,376,731 B1 | 4/2002 | Evans et al. |
| 5,705,712 A | 1/1998 | Frey et al. | | 6,380,328 B1 | 4/2002 | McConville et al. |
| 5,705,728 A | 1/1998 | Viswanathan et al. | | 6,380,423 B2 | 4/2002 | Banning et al. |
| 5,705,729 A | 1/1998 | Huang | | 6,380,444 B1 | 4/2002 | Bjerrum et al. |
| 5,708,246 A | 1/1998 | Camaioni et al. | | 6,395,945 B1 | 5/2002 | Randolph |
| 5,720,858 A | 2/1998 | Noceti et al. | | 6,403,840 B1 | 6/2002 | Zhou et al. |

| Patent | Date | Inventor |
|---|---|---|
| 6,406,523 B1 | 6/2002 | Connor et al. |
| 6,423,211 B1 * | 7/2002 | Randolph et al. ........ 208/262.1 |
| 6,426,441 B1 | 7/2002 | Randolph et al. |
| 6,426,442 B1 | 7/2002 | Ichikawa et al. |
| 6,452,058 B1 | 9/2002 | Schweizer et al. |
| 6,455,650 B1 | 9/2002 | Lipian et al. |
| 6,462,243 B1 | 10/2002 | Zhou et al. |
| 6,465,696 B1 | 10/2002 | Zhou et al. |
| 6,465,699 B1 | 10/2002 | Grosso |
| 6,472,345 B2 | 10/2002 | Hintermann et al. |
| 6,472,572 B1 | 10/2002 | Zhou et al. |
| 6,475,463 B1 | 11/2002 | Elomari et al. |
| 6,475,464 B1 | 11/2002 | Rouleau et al. |
| 6,479,705 B2 | 11/2002 | Murata et al. |
| 6,482,997 B2 | 11/2002 | Petit-Clair et al. |
| 6,486,368 B1 | 11/2002 | Zhou et al. |
| 6,495,484 B1 | 12/2002 | Holtcamp |
| 6,509,485 B2 | 1/2003 | Mul et al. |
| 6,511,526 B2 | 1/2003 | Jagger et al. |
| 6,514,319 B2 | 2/2003 | Keefer et al. |
| 6,518,474 B1 | 2/2003 | Sanderson et al. |
| 6,518,476 B1 | 2/2003 | Culp et al. |
| 6,525,228 B2 | 2/2003 | Chauvin et al. |
| 6,525,230 B2 | 2/2003 | Grosso |
| 6,528,693 B1 | 3/2003 | Gandy et al. |
| 6,538,162 B2 | 3/2003 | Chang et al. |
| 6,540,905 B1 | 4/2003 | Elomari |
| 6,545,191 B1 | 4/2003 | Stauffer |
| 6,547,958 B1 | 4/2003 | Elomari |
| 6,548,040 B1 | 4/2003 | Rouleau et al. |
| 6,552,241 B1 | 4/2003 | Randolph et al. |
| 6,566,572 B2 | 5/2003 | Okamoto et al. |
| 6,572,829 B2 | 6/2003 | Linkous et al. |
| 6,585,953 B2 | 7/2003 | Roberts et al. |
| 6,616,830 B2 | 9/2003 | Elomari |
| 6,620,757 B2 | 9/2003 | McConville et al. |
| 6,632,971 B2 | 10/2003 | Brown et al. |
| 6,635,793 B2 | 10/2003 | Mul et al. |
| 6,641,644 B2 | 11/2003 | Jagger et al. |
| 6,646,102 B2 | 11/2003 | Boriack et al. |
| 6,669,846 B2 | 12/2003 | Perriello |
| 6,672,572 B2 | 1/2004 | Werlen |
| 6,679,986 B1 | 1/2004 | Da Silva et al. |
| 6,680,415 B1 | 1/2004 | Gulotty, Jr. et al. |
| 6,692,626 B2 | 2/2004 | Keefer et al. |
| 6,692,723 B2 | 2/2004 | Rouleau et al. |
| 6,710,213 B2 | 3/2004 | Aoki et al. |
| 6,713,087 B2 | 3/2004 | Tracy et al. |
| 6,713,655 B2 | 3/2004 | Yilmaz et al. |
| RE38,493 E | 4/2004 | Keefer et al. |
| 6,723,808 B2 | 4/2004 | Holtcamp |
| 6,727,400 B2 | 4/2004 | Messier et al. |
| 6,740,146 B2 | 5/2004 | Simonds |
| 6,753,390 B2 | 6/2004 | Ehrman et al. |
| 6,765,120 B2 | 7/2004 | Weber et al. |
| 6,797,845 B1 | 9/2004 | Hickman et al. |
| 6,797,851 B2 | 9/2004 | Martens et al. |
| 6,821,924 B2 | 11/2004 | Gulotty, Jr. et al. |
| 6,822,123 B2 | 11/2004 | Stauffer |
| 6,822,125 B2 | 11/2004 | Lee et al. |
| 6,825,307 B2 | 11/2004 | Goodall |
| 6,825,383 B1 | 11/2004 | Dewkar et al. |
| 6,831,032 B2 | 12/2004 | Spaether |
| 6,838,576 B1 | 1/2005 | Wicki et al. |
| 6,841,063 B2 | 1/2005 | Elomari |
| 6,852,896 B2 | 2/2005 | Stauffer |
| 6,866,950 B2 | 3/2005 | Connor et al. |
| 6,869,903 B2 | 3/2005 | Matsunaga |
| 6,875,339 B2 | 4/2005 | Rangarajan et al. |
| 6,878,853 B2 | 4/2005 | Tanaka et al. |
| 6,888,013 B2 | 5/2005 | Paparatto et al. |
| 6,900,363 B2 | 5/2005 | Harth et al. |
| 6,902,602 B2 | 6/2005 | Keefer et al. |
| 6,903,171 B2 | 6/2005 | Rhodes et al. |
| 6,909,024 B1 | 6/2005 | Jones et al. |
| 6,921,597 B2 | 7/2005 | Keefer et al. |
| 6,933,417 B1 | 8/2005 | Henley et al. |
| 6,946,566 B2 | 9/2005 | Yaegashi et al. |
| 6,953,868 B2 | 10/2005 | Boaen et al. |
| 6,953,873 B2 | 10/2005 | Cortright et al. |
| 6,956,140 B2 | 10/2005 | Ehrenfeld |
| 6,958,306 B2 | 10/2005 | Holtcamp |
| 6,984,763 B2 | 1/2006 | Schweizer et al. |
| 7,001,872 B2 | 2/2006 | Pyecroft et al. |
| 7,002,050 B2 | 2/2006 | Santiago Fernandez et al. |
| 7,011,811 B2 | 3/2006 | Elomari |
| 7,019,182 B2 | 3/2006 | Grosso |
| 7,026,145 B2 | 4/2006 | Mizrahi et al. |
| 7,026,519 B2 | 4/2006 | Santiago Fernandez et al. |
| 7,037,358 B2 | 5/2006 | Babicki et al. |
| 7,045,670 B2 | 5/2006 | Johnson et al. |
| 7,049,388 B2 | 5/2006 | Boriack et al. |
| 7,053,252 B2 | 5/2006 | Boussand et al. |
| 7,057,081 B2 | 6/2006 | Allison et al. |
| 7,060,865 B2 | 6/2006 | Ding et al. |
| 7,064,238 B2 | 6/2006 | Waycuilis |
| 7,064,240 B2 | 6/2006 | Ohno et al. |
| 7,067,448 B1 | 6/2006 | Weitkamp et al. |
| 7,083,714 B2 | 8/2006 | Elomari |
| 7,084,308 B1 | 8/2006 | Stauffer |
| 7,091,270 B2 | 8/2006 | Zilberman et al. |
| 7,091,387 B2 | 8/2006 | Fong et al. |
| 7,091,391 B2 | 8/2006 | Stauffer |
| 7,094,936 B1 | 8/2006 | Owens et al. |
| 7,098,371 B2 | 8/2006 | Mack et al. |
| 7,105,710 B2 | 9/2006 | Boons et al. |
| 7,138,534 B2 | 11/2006 | Forlin et al. |
| 7,141,708 B2 | 11/2006 | Marsella et al. |
| 7,145,045 B2 | 12/2006 | Harmsen et al. |
| 7,148,356 B2 | 12/2006 | Smith, III et al. |
| 7,148,390 B2 | 12/2006 | Zhou et al. |
| 7,151,199 B2 | 12/2006 | Martens et al. |
| 7,161,050 B2 | 1/2007 | Sherman et al. |
| 7,169,730 B2 | 1/2007 | Ma et al. |
| 7,176,340 B2 | 2/2007 | Van Broekhoven et al. |
| 7,176,342 B2 | 2/2007 | Bellussi et al. |
| 7,182,871 B2 | 2/2007 | Perriello |
| 7,193,093 B2 | 3/2007 | Murray et al. |
| 7,196,239 B2 | 3/2007 | Van Egmond et al. |
| 7,199,083 B2 | 4/2007 | Zevallos |
| 7,199,255 B2 | 4/2007 | Murray et al. |
| 7,208,641 B2 | 4/2007 | Nagasaki et al. |
| 7,214,750 B2 | 5/2007 | McDonald et al. |
| 7,220,391 B1 | 5/2007 | Huang et al. |
| 7,226,569 B2 | 6/2007 | Elomari |
| 7,226,576 B2 | 6/2007 | Elomari |
| 7,230,150 B2 | 6/2007 | Grosso et al. |
| 7,230,151 B2 | 6/2007 | Martens et al. |
| 7,232,872 B2 | 6/2007 | Shaffer et al. |
| 7,238,846 B2 | 7/2007 | Janssen et al. |
| 7,244,795 B2 | 7/2007 | Agapiou et al. |
| 7,244,867 B2 | 7/2007 | Waycuilis |
| 7,250,107 B2 | 7/2007 | Benazzi et al. |
| 7,250,542 B2 | 7/2007 | Smith, Jr. et al. |
| 7,252,920 B2 | 8/2007 | Kurokawa et al. |
| 7,253,327 B2 | 8/2007 | Janssens et al. |
| 7,253,328 B2 | 8/2007 | Stauffer |
| 7,265,193 B2 | 9/2007 | Weng et al. |
| 7,267,758 B2 | 9/2007 | Benazzi et al. |
| 7,268,263 B1 | 9/2007 | Frey et al. |
| 7,271,303 B1 | 9/2007 | Sechrist et al. |
| 7,273,957 B2 | 9/2007 | Bakshi et al. |
| 7,282,603 B2 | 10/2007 | Richards |
| 7,285,698 B2 | 10/2007 | Liu et al. |
| 7,304,193 B1 | 12/2007 | Frey et al. |
| 7,342,144 B2 | 3/2008 | Kaizik et al. |

| | | | | | | |
|---|---|---|---|---|---|---|
| 7,348,295 | B2 | 3/2008 | Zones et al. | CA | 2510093 | 12/2006 |
| 7,348,464 | B2 | 3/2008 | Waycuilis | EP | 0021497 | 1/1981 |
| 7,357,904 | B2 | 4/2008 | Zones et al. | EP | 0164798 A1 | 12/1985 |
| 7,361,794 | B2 | 4/2008 | Grosso | EP | 0418971 A1 | 3/1991 |
| 7,390,395 | B2 | 6/2008 | Elomari | EP | 0418974 A1 | 3/1991 |
| 2002/0102672 | A1 | 8/2002 | Mizrahi | EP | 0418975 A1 | 3/1991 |
| 2002/0198416 | A1 | 12/2002 | Zhou et al. | EP | 0510238 A1 | 10/1992 |
| 2003/0004380 | A1 | 1/2003 | Grumann | EP | 0526908 A2 | 2/1993 |
| 2003/0065239 | A1 | 4/2003 | Zhu | EP | 0346612 B1 | 8/1993 |
| 2003/0069452 | A1 | 4/2003 | Sherman et al. | EP | 0560546 A1 | 9/1993 |
| 2003/0078456 | A1 | 4/2003 | Yilmaz et al. | EP | 0976705 A1 | 7/1998 |
| 2003/0120121 | A1 | 6/2003 | Sherman et al. | EP | 1186591 A2 | 3/2002 |
| 2003/0125589 | A1 | 7/2003 | Grosso | EP | 1253126 A1 | 10/2002 |
| 2003/0166973 | A1 | 9/2003 | Zhou et al. | EP | 1312411 A2 | 5/2003 |
| 2004/0006246 | A1 | 1/2004 | Sherman et al. | EP | 1395536 | 3/2004 |
| 2004/0062705 | A1 | 4/2004 | Leduc | EP | 1404636 | 4/2004 |
| 2004/0152929 | A1 | 8/2004 | Clarke | EP | 1235769 B1 | 5/2004 |
| 2004/0158107 | A1 | 8/2004 | Aoki | EP | 1435349 A2 | 7/2004 |
| 2004/0158108 | A1 | 8/2004 | Snoble | EP | 1440939 A1 | 7/2004 |
| 2004/0187684 | A1 | 9/2004 | Elomari | EP | 1474371 | 11/2004 |
| 2005/0047927 | A1 | 3/2005 | Lee et al. | EP | 1235772 B1 | 1/2005 |
| 2005/0148805 | A1 | 7/2005 | Jones | EP | 1661620 A1 | 5/2006 |
| 2005/0171393 | A1 | 8/2005 | Lorkovic | EP | 1760057 A1 | 3/2007 |
| 2005/0192468 | A1 | 9/2005 | Sherman et al. | EP | 1689728 B1 | 4/2007 |
| 2005/0215837 | A1 | 9/2005 | Hoffpauir | EP | 1808227 A1 | 7/2007 |
| 2005/0234276 | A1 | 10/2005 | Waycuilis | EP | 1837320 A1 | 9/2007 |
| 2005/0234277 | A1* | 10/2005 | Waycuilis ............... 585/310 | GB | 5125 | 2/1912 |
| 2005/0245772 | A1 | 11/2005 | Fong | GB | 156122 | 3/1922 |
| 2005/0245777 | A1 | 11/2005 | Fong | GB | 294100 | 6/1929 |
| 2005/0267224 | A1 | 12/2005 | Herling | GB | 363009 | 12/1931 |
| 2006/0025617 | A1 | 2/2006 | Begley | GB | 402928 | 12/1933 |
| 2006/0100469 | A1* | 5/2006 | Waycuilis ............... 585/324 | GB | 474922 A | 11/1937 |
| 2006/0135823 | A1 | 6/2006 | Jun | GB | 536491 | 5/1941 |
| 2006/0138025 | A1 | 6/2006 | Zones | GB | 553950 | 6/1943 |
| 2006/0138026 | A1 | 6/2006 | Chen | GB | 586483 | 3/1947 |
| 2006/0149116 | A1 | 7/2006 | Slaugh | GB | 775590 | 5/1957 |
| 2006/0229228 | A1 | 10/2006 | Komon et al. | GB | 793214 | 4/1958 |
| 2006/0229475 | A1 | 10/2006 | Weiss et al. | GB | 796048 | 6/1958 |
| 2006/0270863 | A1 | 11/2006 | Reiling | GB | 796085 | 6/1958 |
| 2006/0288690 | A1 | 12/2006 | Elomari | GB | 883256 | 11/1961 |
| 2007/0004955 | A1 | 1/2007 | Kay | GB | 950975 | 3/1964 |
| 2007/0078285 | A1 | 4/2007 | Dagle | GB | 950976 | 3/1964 |
| 2007/0100189 | A1 | 5/2007 | Stauffer | GB | 991303 | 5/1965 |
| 2007/0129584 | A1 | 6/2007 | Basset | GB | 995960 | 6/1965 |
| 2007/0142680 | A1 | 6/2007 | Ayoub | GB | 1015033 | 12/1965 |
| 2007/0148067 | A1 | 6/2007 | Zones | GB | 1104294 | 2/1968 |
| 2007/0148086 | A1 | 6/2007 | Zones | GB | 1133752 | 11/1968 |
| 2007/0149778 | A1 | 6/2007 | Zones | GB | 1172002 | 11/1969 |
| 2007/0149789 | A1 | 6/2007 | Zones | GB | 1212240 | 11/1970 |
| 2007/0149819 | A1 | 6/2007 | Zones | GB | 1233299 | 5/1971 |
| 2007/0149824 | A1 | 6/2007 | Zones | GB | 1253618 | 11/1971 |
| 2007/0149837 | A1 | 6/2007 | Zones | GB | 1263806 A | 2/1972 |
| 2007/0197801 | A1 | 8/2007 | Bolk | GB | 1446803 | 8/1976 |
| 2007/0197847 | A1 | 8/2007 | Liu | GB | 1542112 | 3/1979 |
| 2007/0213545 | A1 | 9/2007 | Bolk | GB | 2095243 A | 9/1982 |
| 2007/0238905 | A1 | 10/2007 | Arredondo | GB | 2095245 A | 9/1982 |
| 2007/0238909 | A1 | 10/2007 | Gadewar et al. | GB | 2095249 A | 9/1982 |
| 2007/0276168 | A1 | 11/2007 | Garel | GB | 2116546 A | 9/1982 |
| 2007/0284284 | A1 | 12/2007 | Zones | GB | 2120249 A | 11/1983 |
| 2008/0171898 | A1 | 7/2008 | Waycuilis | GB | 2185754 A | 7/1987 |
| 2008/0183022 | A1 | 7/2008 | Waycuilis | GB | 2191214 A | 12/1987 |
| 2008/0188697 | A1 | 8/2008 | Lorkovic | JP | 2004-529189 | 9/2004 |
| | | | | WO | 83/00859 | 3/1983 |
| | | FOREIGN PATENT DOCUMENTS | | WO | 85/04863 | 11/1985 |
| | | | | WO | 85/04867 | 11/1985 |
| CA | | 1099656 | 4/1981 | WO | 90/08120 | 7/1990 |
| CA | | 1101441 | 5/1981 | WO | 90/08752 | 8/1990 |
| CA | | 1202610 | 4/1986 | WO | 91/18856 | 12/1991 |
| CA | | 2447761 A1 | 11/2002 | WO | 92/03401 | 3/1992 |
| CA | | 2471295 A1 | 7/2003 | WO | 92/12946 | 8/1992 |
| CA | | 2542857 | 5/2005 | WO | 93/16798 | 9/1993 |
| CA | | 2236126 | 8/2006 | WO | 96/22263 | 7/1996 |
| CA | | 2203115 | 9/2006 | WO | 97/44302 | 11/1997 |

| | | |
|---|---|---|
| WO | 98/12165 | 3/1998 |
| WO | 99/07443 | 2/1999 |
| WO | 00/07718 A1 | 2/2000 |
| WO | 00/09261 A1 | 2/2000 |
| WO | 01/14300 A1 | 3/2001 |
| WO | 01/38275 A1 | 5/2001 |
| WO | 01/44149 A1 | 6/2001 |
| WO | 02/094749 A1 | 11/2002 |
| WO | 02/094750 A1 | 11/2002 |
| WO | 02/094751 A2 | 11/2002 |
| WO | 02/094752 A1 | 11/2002 |
| WO | 03/000635 A1 | 1/2003 |
| WO | 03/002251 A2 | 1/2003 |
| WO | 03/018524 A1 | 3/2003 |
| WO | 03/020676 A1 | 3/2003 |
| WO | 03/022827 A1 | 3/2003 |
| WO | 03/043575 A2 | 5/2003 |
| WO | 03/051813 A1 | 6/2003 |
| WO | 03/062143 A1 | 7/2003 |
| WO | 03/062172 A2 | 7/2003 |
| WO | 03/078366 A1 | 9/2003 |
| WO | 2004/018093 A2 | 3/2004 |
| WO | 2004/067487 A2 | 8/2004 |
| WO | 2005/014168 A1 | 2/2005 |
| WO | 2005/019143 A1 | 3/2005 |
| WO | 2005/021468 A1 | 3/2005 |
| WO | 2005/035121 A2 | 4/2005 |
| WO | 2005/037758 A1 | 4/2005 |
| WO | 2005/054120 A2 | 6/2005 |
| WO | 2005/056525 A2 | 6/2005 |
| WO | 2005/058782 A1 | 6/2005 |
| WO | 2005/090272 A1 | 9/2005 |
| WO | 2005/095310 A2 | 10/2005 |
| WO | 2005/105709 A1 | 11/2005 |
| WO | 2005/105715 A1 | 11/2005 |
| WO | 2005/110953 A1 | 11/2005 |
| WO | 2005/113437 A1 | 12/2005 |
| WO | 2005/113440 A1 | 12/2005 |
| WO | 2006/007093 A1 | 1/2006 |
| WO | 2006/015824 A1 | 2/2006 |
| WO | 2006/019399 A2 | 2/2006 |
| WO | 2006/020234 A1 | 2/2006 |
| WO | 2006/036293 A1 | 4/2006 |
| WO | 2006/039213 A1 | 4/2006 |
| WO | 2006/039354 A2 | 4/2006 |
| WO | 2006/043075 A1 | 4/2006 |
| WO | 2006/053345 A1 | 5/2006 |
| WO | 2006-067155 A2 | 6/2006 |
| WO | 2006/067188 A | 6/2006 |
| WO | 2006/067190 A1 | 6/2006 |
| WO | 2006/067191 A1 | 6/2006 |
| WO | 2006/067192 A | 6/2006 |
| WO | 2006/067193 A1 | 6/2006 |
| WO | 2006/069107 A2 | 6/2006 |
| WO | 2006/071354 A1 | 7/2006 |
| WO | 2006/076942 A1 | 7/2006 |
| WO | 2006/083427 A1 | 8/2006 |
| WO | 2006-100312 A2 | 9/2006 |
| WO | 2006/104909 A2 | 10/2006 |
| WO | 2006/104914 A1 | 10/2006 |
| WO | 2006/111997 A1 | 10/2006 |
| WO | 2006/113205 A2 | 10/2006 |
| WO | 2006/118935 A2 | 11/2006 |
| WO | 2007/001934 A2 | 1/2007 |
| WO | 2007/017900 A2 | 2/2007 |
| WO | 2007/044139 A1 | 4/2007 |
| WO | 2007/046986 A2 | 4/2007 |
| WO | 2007/050745 A1 | 5/2007 |
| WO | 2007/071046 A1 | 6/2007 |
| WO | 2007/079038 A2 | 7/2007 |
| WO | 2007/091009 A2 | 8/2007 |
| WO | 2007/094995 A2 | 8/2007 |
| WO | 2007/107031 A1 | 9/2007 |
| WO | 2007/111997 A2 | 10/2007 |
| WO | 2007/114479 A1 | 10/2007 |
| WO | 2007/125332 A1 | 11/2007 |
| WO | 2007/130054 A1 | 11/2007 |
| WO | 2007/130055 A1 | 11/2007 |
| WO | 2007/141295 A1 | 12/2007 |
| WO | 2007/142745 A1 | 12/2007 |
| WO | 2008/036562 | 3/2008 |
| WO | 2008/036563 | 3/2008 |
| WO | 2008/106319 | 9/2008 |
| WO | 2008/157043 | 12/2008 |
| WO | 2008/157044 | 12/2008 |
| WO | 2008/157045 | 12/2008 |
| WO | 2008/157046 | 12/2008 |
| WO | 2008/157047 | 12/2008 |

OTHER PUBLICATIONS

U.S. Appl. No. 60/559,844, filed Apr. 6, 2004, Sherman et al.
U.S. Appl. No. 60/765,115, filed Feb. 3, 2006, Gadewar et al.
Abstract of JP2007045756, Hydrogenation method using diaphragm type hydrogenation catalyst, hydrogenation reaction apparatus and diaphragm type hydrogenation catalyst, Publication date: Feb. 22, 2007, Inventor: Shuji et al., esp@cenet database—worldwide.
Abstract of JP2007061594, Method for decomposing organohalogen compound and mobile decomposition system, Publication date: Mar. 15, 2007, Inventor: Koichi et al., esp@cenet database—worldwide.
Abstract of JP2007099729, Method for producing alpha-methylstyrene or cumene, Publication date: Apr. 19, 2007, Inventor: Toshio, esp@cenet database—worldwide.
Abstract of RO119778, Process for preparing perchloroethylene, Publication date: Mar. 30, 2005, Inventor: Horia et al., esp@cenet database—worldwide.
Abstract of WO0105737, Method for preparing a carboxylic acid, Publication date: Jan. 25, 2001, Inventor: Pascal et al., esp@cenet database—worldwide.
Abstract of WO0105738, Method for preparing a carboxylic acid, Publication date: Jan. 25, 2001, Inventor: Pascal et al., esp@cenet database—worldwide.
Abstract of WO2004092099, Method for producing cyclic enols, Publication date: Oct. 28, 2004, Inventor: Marko et al., esp@cenet database—worldwide.
Abstract of WO2006063852, Electroluminescent polymers and use thereof, Publication date: Jun. 22, 2006, Inventor: Arne et al., esp@cenet database—worldwide.
Abstract of WO2006136135, Method for decarboxylating C-C cross-linking of carboxylic acids with carbon electrophiles, Publication date: Dec. 28, 2006, Inventor: Goossen Lukas et al., esp@cenet database—worldwide.
Abstract of WO2007028761, Method for chlorinating alcohols, Publication date: Mar. 15, 2007, Inventor: Rohde et al., esp@cenet database—worldwide.
Abstract of WO2007128842, Catalytic transalkylation of dialkyl benzenes, Publication date: Nov. 15, 2007, Inventor: Goncalvesalmeida et al., esp@cenet database—worldwide.
Abstract of WO2007137566, Method for catalytic conversion of organic oxygenated compounds from biomaterials, Publication date: Dec. 6, 2007, Inventor: Reschetilowski, esp@cenet database—worldwide.
Abstract of WO9721656, Method for making fluoroalkanols, Publication date: Jun. 19, 1997, Inventor: Gillet, esp@cenet database—worldwide.
Abstract of WO9950213, Method for producing dialkyl ethers, Publication date: Oct. 7, 1999, Inventor: Falkowski Juergen et al., esp@cenet database—worldwide.
Adachi, et al.; Synthesis of Sialyl Lewis X Ganglioside Analogs Containing a Variable Length Spacer Between the Sugar and Lipophilic Moieties; J. Carbohydrate Chem., vol. 17, No. 4-5, (1998), pp. 595-607, XP009081720.
Abstract of EP0039471, Process for the preparation of 2-chloro-1,1,1,2,3,3,3-heptafluoropropane, Publication date: Nov. 11, 1981, Inventor: Von Halasz, esp@cenet database—worldwide.

Abstract of EP0101337, Process for the production of methylene chloride, Publication date: Feb. 22, 1984, Inventor Olah et al., esp@cenet database—worldwide.

Abstract of EP0407989, Method for the production of 1,1,1-trifluoro-2,2-dichloroethane by photochlorination, Publication date: Jan. 16, 1991, Inventor: Cremer et al., esp@cenet database—worldwide.

Abstract of EP0442258, Process for the preparation of a polyunsaturated olefin, Publication date: Aug. 21, 1991, Inventor: Gaudin et al., esp@cenet database—worldwide.

Abstract of EP0465294, Process for the preparation of unsaturated bromides, Publication date: Jan. 8, 1992, Inventor: Decaudin et al., esp@cenet database—worldwide.

Abstract of EP0549387, Synthesis of n-perfluorooctylbromide, Publication date: Jun. 30, 1993, Inventor: Drivon et al., esp@cenet database—worldwide.

Abstract of EP0850906, Process and apparatus for the etherification of olefinic hydrocarbon feedstocks, Publication date: Jul. 1, 1998, Inventor: Masson, esp@cenet database—worldwide.

Abstract of EP0858987, Process for the conversion of lighter alkanes to higher hydrocarbons, Publication date: Aug. 18, 1998, Inventor: Amariglio et al., esp@cenet database—worldwide.

Bakker, et al.; An Exploratory Study of the Addition Reaction of Ethyleneglcol, 2-Chloroethanlo and 1, 3-Dichloro-2-Propanol to 1-Dodecene; J. Am. Oil Chem. Soc., vol. 44, No. 9 (1967), pp. 517-521; XP009081570.

Abstract of EP0235110, Process for the stabilization of silicalite catalysts, Publication date: Sep. 2, 1987, Inventor: Debras et al., esp@cenet database—worldwide.

Bouzide et al.; Highly Selective Silver (I) Oxide Mediated Monoprotection of Symmetricl Diols; Tetrahedron Letters, Elsevier, vol. 38, No. 34 (1997), pp. 5945-5948; XP004094157.

Combined International Search Report and Written Opinion Dated Apr. 17, 2007 for PCT/US06/13394, in the name of GRT, Inc.

Gibson; Phase-Transfer Synthesis of Monoalkyl Ethers of Oligoethylene Glycols; Journal of Organic Chemistry, vol. 45, No. 6 (1980) pp. 1095-1098; XP002427776.

Klabunde, Kenneth J., et al., Changes in Texture and Catalytic Activity of Nanocrystalline MgO during Its Transformation to MgC12 in the Reaction with 1-Chlorobutane, J. Phys. Chem. B 2001, 105, 3937-3941.

Loiseau et al.; Multigram Synthesis of Well-Defined Extended Bifunctional Polyethylene Glycol (PEG) Chains; J. of Organic Chem., vol. 69, No. 3 (2004), pp. 639-647; XP002345040.

Mihai et al.; Application of Bronsted-type LFER in the study of phospholipase C mechanism; J. Am. Chem. Soc., vol. 125, No. 11 (2003) pp. 3236-3242; XP002427799.

Motupally et al., Recycling Chlorine from Hydrogen Chloride: A New and Economical Electrolytic Process, The Electrochemical Society Interface, Fall 1998.

Nishikawa et al.; Ultrasonic Relaxations in Aqueous Solutions of Alcohols and the Balance Between Hydrophobicity and Hydrophilicity of the Solutes; J. Phys. Chem. vol. 97, No. 14 (1993), pp. 3539-3544; XP002427775.

Prelog et al.; Chirale 2,2'-Polyoxaalkano-9,9'-Spirobifluorene; Helvetica Chimica ACTA, vol. 62, No. 7, (1979) pp. 2285-2302; XP002030901.

Shimizu et al., Gas-Phase Electrolysis of Hydrobromic Acid Using PTFE-Bonded Carbon Eletrode, Int. J. Hydrogen Energy, vol. 13, No. 6. pp. 345-349, 1988.

Velzen et al., HBr Electrolysis in the Ispra Mark 13A Flue Gas Desulphurization Process: Electrolysis in a DEM Cell, J. of Applied Electrochemistry, vol. 20, pp. 60-68, 1990.

Whitesides et al.; Nuclear Magnetic Resonance Spectroscopy. The Effect of Structure on Magnetic Nonequivalence Due to Molecular Asymmetry; J. Am. Chem. Soc., vol. 86, No. 13 (1964), pp. 2628-2634; XP002427774.

JLM Technology Ltd.; "The Miller GLS Technology for Conversion of Light Hydrocarbons to Alcohols"; New Science for the Benefit of Humanity; May 31, 2000; pp. 1-10.

Jaumain, Denis and Su, Bao-Lian; "Direct Catalytic Conversion of Chloromethane to Higher Hydrocarbons Over Various Protonic and Cationic Zeolite Catalysts as Studied by in-situ FTIR and Catalytic Testing"; 2000; pp. 1607-1612; Studies in Surface Science and Catalysis 130; Elsevier Science B.V.

Taylor, Charles E.; "Conversion of Substituted Methanes Over ZSM-Catalysts"; 2000; pp. 3633-3638; Studies in Surface Science and Catalysis 130; Elsevier Science B.V.

ZSM-5 Catalyst; http://chemelab.ucsd.edu/methanol/memos/ZSM-5.html; Nov. 6, 2003; p. 1.

Final Report; "Abstract"; http://chemelab.ucsd.edu/methanol/memos/final.html; May 9, 2004; pp. 1-7.

Driscoll, Daniel J.; "Direct Methane Conversion"; Federal Energy Technology Center, U.S. Department of Energy; M970779; 2001; pp. 1-10.

Olah et al.; "Selective Monohalogenation of Methane over Supported Acid or Platinum Metal Catalysts and Hydrolysis of Methyl Halides . . . "; J. American Chemical Society 1985, vol. 107; 0002-7863/85/1507-7097$01.50/0; pp. 7097-7105.

Murray et al.; "Conversion of Methyl Halides to Hydrocarbons on Basic Zeolites: A Discovery by in Situ NMR"; J. American Chemical Society 1993, vol. 115; pp. 4732-4741.

Lorkovic et al.; "A Novel Integrated Process for the Functionalization of Methane and Ethane: Bromine as Mediator", Catalysis Today 98; 2004; pp. 317-322.

Lorkovic et al.; "C1 Oxidative Coupling via Bromine Activation and Tandem Catalytic Condensation over CaO/Zeolite Composites II . . . "; Catalysis Today 98; 2004; pp. 589-594.

Olah et al.; "Antimony Pentafluoride/Graphite Catalyzed Oxidative Conversion of Methyl Halides with Copper Oxides (or Copper/Oxygen) to Dimethyl Ether"; J. Org. Chem. 1990, 55; 1990 American Chemical Society; pp. 4289-4293.

Taylor, Charles E. et al.; "Direct Conversion of Methane to Liquid Hydrocarbons Through Chlorocarbon Intermediates"; 1988 Elsevier Science Publishers B.V. Amsterdam, Netherlands; pp. 483-489.

Chang, Clarence D. et al.; "The Conversion of Methanol and Other O-Compounds to Hydrocarbons over Zeolite Catalysts"; Journal of Catalysis 47; 1977; Academic Press, Inc.; pp. 249-259.

Zhou, Xiao-Ping et al.; "An Integrated Process for Partial Oxidation of Alkanes"; Chem. Commun. 2003; The Royal Society of Chemistry 2003; pp. 2294-2295.

Sun, Shouli et al.; "A General Integrated Process for Synthesizing Olefin Oxides"; Chem. Commun. 2004; The Royal Society of Chemistry 2004; pp. 2100-2101.

Lorkovic, Ivan M. et al.; "C1 Oxidative Coupling via Bromine Activation and Tandem Catalytic Condensation and Neutralization over CaO/Zeolite Composites II . . . "; Catalysis Today 98; 2004; pp. 589-594.

Yilmaz, Aysen et al.; "Bromine Mediated Partial Oxidation of Ethane over Nanostructured Zirconia Supported Metal Oxide/Bromide"; Microporous and Mesporous Materials, 79; 2005; pp. 205-214.

Taylor, Charles E.; "PETC's On-Site Natural Gas Conversion Efforts"; Preprints of the Fuel Division, 208th National Meeting of the American Chemical Society, 39 (4); 1994; pp. 1228-1232.

Ione et al.; "Syntheses of Hydrocarbons from Compounds Containing One Carbon Atom Using Bifunctional Zeolite Catalysts"; Solid Fuel Chemistry (Khimiya Tverdogo Topliva); 1982; pp. 29-43; vol. 16, No. 6; Allerton Press. Inc.

Olah, George A. et al.; "Hydrocarbons Through Methane Derivatives"; Hydrocarbon Chemistry; 1995; pp. 89-90; John Wiley & Sons, Inc.

Akhrem, Irena S. et al.; "Ionic Bromination of Ethane and Other Alkanes (Cycloalkanes) with Bromine Catalyzed by the Polyhalomethane-2AlBr3 Aprotic Organic Superacids Under Mild Conditions"; Tetrahedron Letters, vol. 36, No. 51, 1995; pp. 9365-9368; Pergamon; Great Britain.

Smirnov, Vladimir V. et al.; "Selective Bromination of Alkanes and Arylalkanes with CBr4"; Mendeleev Commun. 2000; pp. 175-176.

Olah, George A.; "Electrophilic Methane Conversion"; Acc. Chem. Res. 1987, 20; pp. 422-428; American Chemical Society, Loker Hydrocarbon Research Institute and Dept. of Chemistry; University of Southern California.

Olah, George A. et al.; "Antimony Pentafluoride/Graphite Catalyzed Oxidative Carbonylation of Methyl Halides with Carbon Monoxide and Copper Oxides (or Copper/Oxygen) to Methyl Acetate"; J. Org.

Chem. 1990, 55; pp. 4293-4297; Loker Hydrocarbon Research Institute and Dept. of Chemistry; University of Southern California.
Bagno, Alessandro et al.; "Superacid-Catalyzed Carbonylation of Methane, Methyl Halides, Methyl Alcohol, and Dimethyl Ether to Methyl Acetate and Acetic Acid"; J. Org. Chem. 1990, 55; pp. 4284-4289; Loker Hydrocarbon Research Institute; University of Southern California.
Olah, George A. et al.; "Onium Ylide Chemistry. 1. Bifunctional Acid-Base-Catalyzed Conversion of Heterosubstituted Methanes into Ethylene and Derived Hydrocarbons. The Onium Ylide Mechanism of the C1-C2 Conversion"; J. Am. Chem. Soc. 1984, 106; pp. 2143-2149.
Mochida, Isao et al.; "The Catalytic Dehydrohalogenation of Haloethanes on Solid Acids and Bases"; Bulletin of the Chemical Society of Japan, vol. 44; 1971; pp. 3305-3310.
Richards, Ryan et al.; "Nanocrystalline Ultra High Surface Area Magnesium Oxide as a Selective Base Catalyst"; Scripta Materialia, 44; 2001; pp. 1663-1666; Elsevier Science Ltd.
Sun, Naijian et al.; "Nanocrystal Metal Oxide—Chlorine Adducts: Selective Catalysts for Chlorination of Alkanes"; J. Am. Chem. Soc. 1999, 121; pp. 5587-5588; American Chemical Society.
Mishakov, Ilya V. et al.; "Nanocrystalline MgO as a Dehydrohalogenation Catalyst"; Journal of Catalysis 206; 2002; pp. 40-48; Elsevier Science, USA.
Wagner, George W. et al.; "Reactions of VX, GD, and HD with Nanosize CaO: Autocatalytic Dehydrohalogenation of HD"; J. Phys. Chem. B 2000, 104; pp. 5118-5123; 2000 American Chemical Society.
Fenelonov, Vladimir B. et al.; "Changes in Texture and Catalytic Activity of Nanocrystalline MgO during Its Transformation to MgCl2 in the Reaction with 1-Chlorobutane"; J. Phys. Chem. B 2001, 105; pp. 3937-3941; 2001 American Chemical Society.
http://webbook.nist.gov/; "Welcome to the NIST Chemistry WebBook"; 2005; U.S. Secretary of Commerce on Behalf of the United States of America.
Claude, Marion C. et al.; "Monomethyl-Branching of Long n-Alkanes in the Range from Decane to Tetracosane on Pt/H-ZSM-22 Bifunctional Catalyst"; Journal of Catalysis 190; 2000; pp. 39-48.
Thomas, J. M. et al.; "Synthesis and Characterization of a Catalytically Active Nickel-Silicoaluminophosphate Catalyst for the Conversion of Methanol to Ethene"; Chem. Mater.; 1991, 3; pp. 667-672; 1991 American Chemical Society.
Thomas, John Meurig et al.; "Catalytically Active Centres in Porous Oxides: Design and Performance of Highly Selective New Catalysts"; Chem. Commun.; 2001; pp. 675-687.
Lorkovic, Ivan et al.; "C1 Coupling via Bromine Activation and Tandem Catalytic Condensation and Neutralization over CaO/Zeolite Composites"; Chem. Commun., 2004; pp. 566-567.
Tamura, Masuhiko et al.; "The Reactions of Grignard Reagents with Transition Metal Halides: Coupling, Disproportionation, and Exchange with Olefins"; Bulletin of the Chemical Society of Japan, vol. 44.; Nov. 1971; pp. 3063-3073.
Weissermel, Klaus et al.; "Industrial Organic Chemistry"; 3rd Edition 1997. pp. 160-162, and 208.
Abstract of BE812868, Aromatic hydrocarbons prodn. from chlorinated hydrocarbons, Publication date: Sep. 27, 1974, esp@cenet database—worldwide.
Abstract of BE814900, Volatile aramatic cpds. prodn., Publication date: Sep. 2, 1974, esp@cenet database—worldwide.
Abstract of CN1199039, Pentanol and its production process, Publication date: Nov. 18, 1998, Inventor: Kailun, esp@cenet database—worldwide.
Abstract of CN1210847, Process for producing low carbon alcohol by directly hydrating low carbon olefines, Publication date: Mar. 17, 1999, Inventor: Zhenguo et al., esp@cenet database—worldwide.
Abstract of CN1321728, Method for preparing aromatic hydrocarbon and hydrogen gas by using low-pressure gas, Publication date: Nov. 14, 2001, Inventor: Jie et al., esp@cenet database—worldwide.
Abstract of CN1451721, Process for non-catalytic combustion deoxidizing coal mine gas for producing methanol, Publication date: Oct. 29, 2003, Inventor: Pengwan et al., esp@cenet database—worldwide.

Abstract of CN1623969, Method for preparing 1, 4-benzene dimethanol, Publication date: Jun. 8, 2005, Inventor: Jiarong et al., esp@cenet database—worldwide.
Abstract of CN1657592, Method for converting oil to multiple energy fuel product, Publication date: Aug. 24, 2005, Inventor: Li, esp@cenet database—worldwide.
Abstract of CN1687316, Method for producing biologic diesel oil from rosin, Publication date: Oct. 26, 2005, Inventor: Jianchun et al., esp@cenet database—worldwide.
Abstract of CN1696248, Method for synthesizing biologic diesel oil based on ion liquid, Publication date: Nov. 16, 2005, Inventor: Sun, esp@cenet database—worldwide.
Abstract of CN1699516, Process for preparing bio-diesel-oil by using microalgae fat, Publication date: Nov. 23, 2005, Inventor: Miao, esp@cenet database—worldwide.
Abstract of CN1704392, Process for producing alkylbenzene, Publication date: Dec. 7, 2005, Inventor: Gao, esp@cenet database—worldwide.
Abstract of CN1724612, Biological diesel oil catalyst and method of synthesizing biological diesel oil using sai catalyst, Publication date: Jan. 25, 2006, Inventor: Gu, esp@cenet database—worldwide.
Abstract of CN1986737, Process of producing biodiesel oil with catering waste oil, Publication date: Jun. 27, 2007, Inventor: Chen, esp@cenet database—worldwide.
Abstract of CN100999680, Esterification reaction tech. of preparing biodiesel by waste oil, Publication date: Jul. 18, 2007, Inventor: Weiming, esp@cenet database—worldwide.
Abstract of CN101016229, Refining method for bromomeoamyl alcohol, Publication date: Aug. 15, 2007, Inventor: Tian, esp@cenet database—worldwide.
Abstract of DE3209964, Process for the preparation of chlorinated hydrocarbons, Publication date: Nov. 11, 1982, Inventor: Pyke et al., esp@cenet database—worldwide.
Abstract of DE3210196, Process for the preparation of a monochlorinated olefin, Publication date: Jan. 5, 1983, Inventor: Pyke et al., esp@cenet database—worldwide.
Abstract of DE3226028, Process for the preparation of monochlorinated olefin, Publication date: Feb. 3, 1983, Inventor: Pyke et al., esp@cenet database—worldwide.
Abstract of DE3334225, Process for the preparation of 1, 2-dichloroethane, Publication date: Apr. 4, 1985, Inventor: Hebgen et al., esp@cenet database—worldwide.
Abstract of DE4232056, 2,5-Di:methyl-hexane-2, 5-di:ol continuous prodn. from tert. butanol—by oxidative dimerisation in two phase system with vigorous stirring, using aq. phase with specified density to facilitate phase sepn., Publication date: Mar. 31, 1994, Inventor: Gnann et al., esp@cenet database—worldwide.
Abstract of DE4434823, Continuous prodn. of hydroxy-benzyl alkyl ether, Publication date: Apr. 4, 1996, Inventor Stein et al., esp@cenet database—worldwide.
Abstract of FR2692259, Aromatisation of 2-4C hydrocarbons—using a fixed-mobile-catalytic bed process, Publication date: Dec. 17, 1993, Inventor: Alario et al., esp@cenet database—worldwide.
Abstract of FR2880019, Manufacturing 1, 2-dichloroethane, comprises cracking core hydrocarbonated source, separating into fractions, sending into chlorination reaction chamber and oxychlorination reaction chamber and separating from chambers, Publication date: Jun. 30, 2006, Inventor: Strebelle et al., esp@cenet database—worldwide.
Abstract of FR2883870, Formation of 1, 2-dichloroethane useful in manufacture of vinyl chloride involves subjecting mixture of cracking products obtained by cracking of hydrocarbon source, to a succession of aqueous quenching, alkaline washing, and oxidation steps, Publication date: Oct. 6, 2006, Inventor: Balthasart et al., esp@cenet database—worldwide.
Abstract of FR2883871, Preparing 1, 2-dichloroethane comprises cracking hydrocarbon to form mixture, sending mixture into storage reservoir, supplying mixture into chlorination and/or oxychloration reactor, and separating 1, 2-dichloroethane from reactor, Publication date: Oct. 6, 2006, Inventor: Balthasart et al., esp@cenet database—worldwide.

Abstract of IT1255246, Process for the preparation of dinitrodiphenylmethanes, Publication date: Oct 20, 1995, Applicant: Enichem Spa et al., esp@cenet database—worldwide.

Abstract of IT1255358, Process for the synthesis of 1, 4-butanediol, Publication date: Oct. 31, 1995, Inventor: Marco, esp@cenet database—worldwide.

Abstract of JP2142740, Production of fluoroalcohol, Publication date: May 31, 1990, Inventor: Tsutomu et al., esp@cenet database—worldwide.

Abstract of JP2144150, Chemical process and catalyst used therefore, Publication date: Jun. 1, 1990, Inventor: Deidamusu et al., esp@cenet database—worldwide.

Abstract of JP4305542, Production of halogenated hydrocarbon compounds, Publication date: Oct. 28, 1992, Inventor: Shinsuke et al., esp@cenet database—worldwide.

Abstract of JP6172225, Method for fluorinating halogenated hydrocarbon, Publication date: Jun. 21, 1994, Inventor: Takashi et al., esp@cenet database—worldwide.

Abstract of JP6206834, Production of tetrachloroethanes, Publication date: Jul. 26, 1994, Inventor: Toshiro et al., esp@cenet database—worldwide.

Abstract of JP8266888, Method for decomposing aromatic halogen compound, Publication date: Oct. 15, 1996, Inventor: Yuuji et al., esp@cenet database—worldwide.

Abstract of JP2001031605, Production of 3-hydroxy-1-cycloalkene, Publication date: Feb. 6, 2001, Inventor: Hideo et al, esp@cenet database - worldwide.

Abstract of JP2004075683, Method for producing optically active halogenohydroxypropyl compound and glycidyl compound, Publication date: Mar. 11, 2004, Inventor: Keisuke et al., esp@cenet database—worldwide.

Abstract of JP2004189655, Method for fluorinating with microwave, Publication date: Jul. 8, 2004, Inventor: Masaharu et al., esp@cenet database—worldwide.

Abstract of JP2005075798, Method for Producing adamantyl ester compound, Publication date: Mar. 24, 2005, Inventor: Norihiro et al., esp@cenet database—worldwide.

Abstract of JP2005082563, Method for producing 1, 3-adamantanediol, Publication date: Mar. 31, 2005, Inventor: Norihiro et al., esp@cenet database—worldwide.

Abstract of JP2005145977, Process for catalytically oxidizing olefin and cycloolefin for the purpose of forming enol, olefin ketone, and epoxide, Publication date: Jun. 9, 2005, Inventor: Cancheng et al., esp@cenet database—worldwide.

Abstract of JP2005254092, Method of manufacturing alkynes, Publication date: Sep. 22, 2005, Inventor: Shirakawa Eiji, esp@cenet database—worldwide.

Abstract of JP2006151892, Preparation method of alcohol derivative, Publication date: Jun. 15, 2006, Inventor: Baba Akio et al., esp@cenet database—worldwide.

Abstract of JP2006152263, Organic-inorganic hybrid-type mesoporous material, method for producing the same, and solid catalyst, Publication date: Jun. 15, 2006, Inventor: Junko et al., esp@cenet database—worldwide.

Abstract of JP2006193473, Aryl polyadamantane derivative having carboxy or acid anhydride group and method for producing the same, Publication date: Jul. 27, 2006, Inventor: Yasuto et al., esp@cenet database—worldwide.

Abstract of JP2006231318, Phosphorus containing macromolecule immobilizing palladium catalyst and method for using the same, Publication date: Sep. 7, 2006, Inventor: Osamu et al., esp@cenet database—worldwide.

Abstract of JP2006263567, Optical resolution method of optical isomer and optical resolution device, Publication date: Oct. 5, 2006, Inventor: Yoshikazu et al., esp@cenet database—worldwide.

Abstract of JP2006265157, Method for catalytically activating silicated nucleating agent using phosphazene base, Publication date: Oct. 5, 2006, Inventor: Yoshinori et al., esp@cenet database—worldwide.

Abstract of JP2006306758, Method for producing biaryl compound, Publication date: Nov. 9, 2006, Inventor: Yuji et al., esp@cenet database—worldwide.

Abstract of JP2007001942, Production method of para-xylene, Publication date: Jan. 11, 2007, Inventor: Kazuyoshi, esp@cenet database—worldwide.

Abstract of JP2007015994, Method for synthesizing organic compound in ultra high rate under high temperature and high pressure water, and system of high temperature and high pressure reaction, Publication date: Jan. 25, 2007, Inventor: Hajime et al., esp@cenet database—worldwide.

U.S. Office Action from U.S. Appl. No. 10/826,885 dated Oct. 31, 2005.

U.S. Office Action from U.S. Appl. No. 10/826,885 dated Apr. 19, 2006.

U.S. Office Action from U.S. Appl. No. 10/826,885 dated Jul. 27, 2006.

U.S. Office Action from U.S. Appl. No. 10/826,885 dated Nov. 2, 2006.

U.S. Office Action from U.S. Appl. No. 10/826,885 dated Jan. 24, 2007.

U.S. Office Action from U.S. Appl. No. 11/101,886 dated Jan. 24, 2007.

U.S. Office Action from U.S. Appl. No. 11/254,438 dated Jan. 24, 2007.

U.S. Office Action from U.S. Appl. No. 11/254,438 dated Nov. 1, 2007.

U.S. Office Action from U.S. Appl. No. 10/893,418 dated Jan. 2, 2008.

U.S. Office Action from U.S. Appl. No. 10/893,418 dated Jun. 14, 2007.

U.S. Office Action from U.S. Appl. No. 11/091,130 dated Oct. 3, 2007.

U.S. Office Action from U.S. Appl. No. 10/365,346 dated Jun. 12, 2006.

U.S. Office Action from U.S. Appl. No. 11/103,326 dated Aug. 31, 2007.

U.S. Office Action from U.S. Appl. No. 11/103,326 dated Dec. 6, 2006.

U.S. Office Action from U.S. Appl. No. 11/098,997 dated Nov. 20, 2008.

U.S. Office Action from U.S. Appl. No. 12/215,326 dated Feb. 10, 2009.

U.S. Office Action from U.S. Appl. No. 10/430,240 dated Mar. 6, 2006.

U.S. Office Action from U.S. Appl. No. 10/369,148 dated Oct. 16, 2006.

U.S. Office Action from U.S. Appl. No. 10/369,148 dated Mar. 14, 2006.

U.S. Office Action from U.S. Appl. No. 10/894,165 dated Aug. 16, 2006.

U.S. Office Action from U.S. Appl. No. 12/080,594 dated Dec. 22, 2008.

U.S. Office Action from U.S. Appl. No. 11/703,358 dated Jun. 11, 2008.

* cited by examiner

SEPARATION OF LIGHT GASES FROM HALOGENS

CROSS-REFERENCE TO RELATED APPLICATION

This application is based on and claims priority of U.S. Provisional Patent Application No. 60/765,473, filed Feb. 3, 2006, the entire contents of which are incorporated by reference herein.

FIELD OF THE INVENTION

This invention generally relates to processes for separating inert gases and other compounds from halogens.

BACKGROUND OF THE INVENTION

The choice between air and oxygen as a medium for oxidation has been explored for many industrial processes. For processes where air can be used for oxidation without adversely affecting the reaction chemistry, air is preferred over a pure oxygen feed for reduced capital and operating cost. The higher cost of oxygen results from the expense of separating oxygen from nitrogen, conventionally accomplished using either membranes or distillation. One example where the use of pure oxygen is preferred over air is in syngas production, which is the first step in the production of liquid hydrocarbons from natural gas using Fischer Tropsch synthesis. In addition to affecting the reaction chemistry, the use of air in the syngas generation requires nitrogen to be separated from unconverted natural gas. The separation of nitrogen from natural gas is cost-intensive, and is conventionally carried out using membranes or pressure swing adsorption.

A conventional method of capturing trace bromine in inert gas streams is to use an alkaline scrubber, for example, an aqueous NaOH solution. It is not easy to recover the captured bromine from the conventional scrubbing method. Other conventional methods include the use of sodium sulfite, sodium bisulfite, or an aqueous solution of calcium hydroxide, etc., each of which suffers from the same drawback that the captured bromine is difficult to recover.

Technology developed by GRT, Inc., of Santa Barbara, Calif., allows higher hydrocarbons to be synthesized from methane or natural gas by mixing the hydrocarbon(s) and halogen in a reactor to form alkyl halides and hydrogen halide, HX. The alkyl halides and HX are directed into contact with a metal oxide or similar material to form higher hydrocarbons and a metal halide. The metal halide is oxidized to metal oxide and halogen, both of which are recycled. When air is used for oxidation, the halogen that is generated contains inert gases such as nitrogen and carbon dioxide which, if not removed, would pass through the halogenation section and the coupling section where higher hydrocarbons are produced. In other technology developed by GRT, Inc., hydrocarbons are formed by reacting alkyl halides with halogen in the presence of a catalyst, HX is formed as a byproduct. To regenerate halogen for use in a subsequent cycle of the overall process, HX is oxidized with air or oxygen in the presence of a catalyst. For both types of technologies, it is desirable to separate the regenerated halogen from $N_2$, $CO_2$, and other light gases (such as unreacted light hydrocarbons), and water before the halogen is used in the next process cycle. For a cyclic or continuous process, such gases, particularly nitrogen, would rapidly accumulate if not separated A clear need exists for an efficient, cost-effective process of separating inert gases and other compounds from halogens.

SUMMARY OF THE INVENTION

According to the invention, a process is provided for separating one or more light gases from bromine or chlorine using one or more physical separations and contact with a chemical scrubber to recover additional halogen. According to one aspect of the invention, the process comprises (a) providing a feed of halogen containing one or more light gases to a distillation column or flash vaporizer; (b) operating the distillation column or flash vaporizer to separate the feed into (i) a first liquid containing a major amount of halogen and no more than a minor amount of light gas(es), and (ii) a first vapor containing a major amount of light gas(es) and no more than a minor amount of halogen; and (c) providing the vapor to a chemical scrubber to recover halogen from the vapor.

In a second aspect of the invention, two or more physical separations are used, with each separation leading to successively greater enrichment of, respectively, the halogen in the liquid phase and the light gas(es) in the vapor phase. For example, the vapor from a distillation column (enriched in light gas(es)) can be fed to a second distillation column, which further separates the material into a new vapor and a new liquid, the new vapor being more enriched in light gas(es), and the new liquid being more enriched in halogen.

The chemical scrubber utilized in the invention contains one or more halogen scavengers, materials which are capable of chemically sorbing halogen, in some embodiments through a redox reaction with the halogen. A preferred material is copper (I) bromide (CuBr, "cuprous bromide"), which can adsorb bromine by conversion into copper (II) bromide (CuBr2, "cupric bromide").

BRIEF DESCRIPTION OF THE DRAWINGS

The features and advantages of the invention will become better understood when considered in light of the following detailed description, and by making reference to the following drawings, wherein.

DETAILED DESCRIPTION OF THE INVENTION

In the novel process of this invention, one or more light gases are separated from bromine or chlorine by physically separating a feed of the halogen containing one or more light gases into a liquid and a vapor, the liquid containing a major amount of halogen and no more than a minor amount of light gas(es), and the vapor containing a major amount of light gas(es) and no more than a minor amount of halogen. Additional halogen is removed from the vapor by passing it through a chemical scrubber containing a halogen scavenger. As used herein, a "light gas" is one having a lower boiling point than the halogen with which it is mixed. The boiling points of bromine and chlorine at atmospheric pressure approximately 59° C. and −34° C., respectively. Included in the definition are such gases as nitrogen ($N_2$), carbon dioxide ($CO_2$), and "light hydrocarbons"—$C_1$-$C_4$ hydrocarbons, with the caveat that $C_4$ hydrocarbons (butanes and butenes) are not considered "light gases" if chlorine is the halogen of interest, as the boiling point of chlorine is less than that of $C_4$ hydrocarbons. The terms "major amount" and "minor amount" are relative; a liquid (or vapor) containing a major amount of a first component and a minor amount of a second component contains more of the first component than of the second component. In general, in most of the embodiments of the invention, a given liquid (or vapor) phase will consist predominately of one component (halogen or light gas(es), with very little of the other component.

Figure 1:
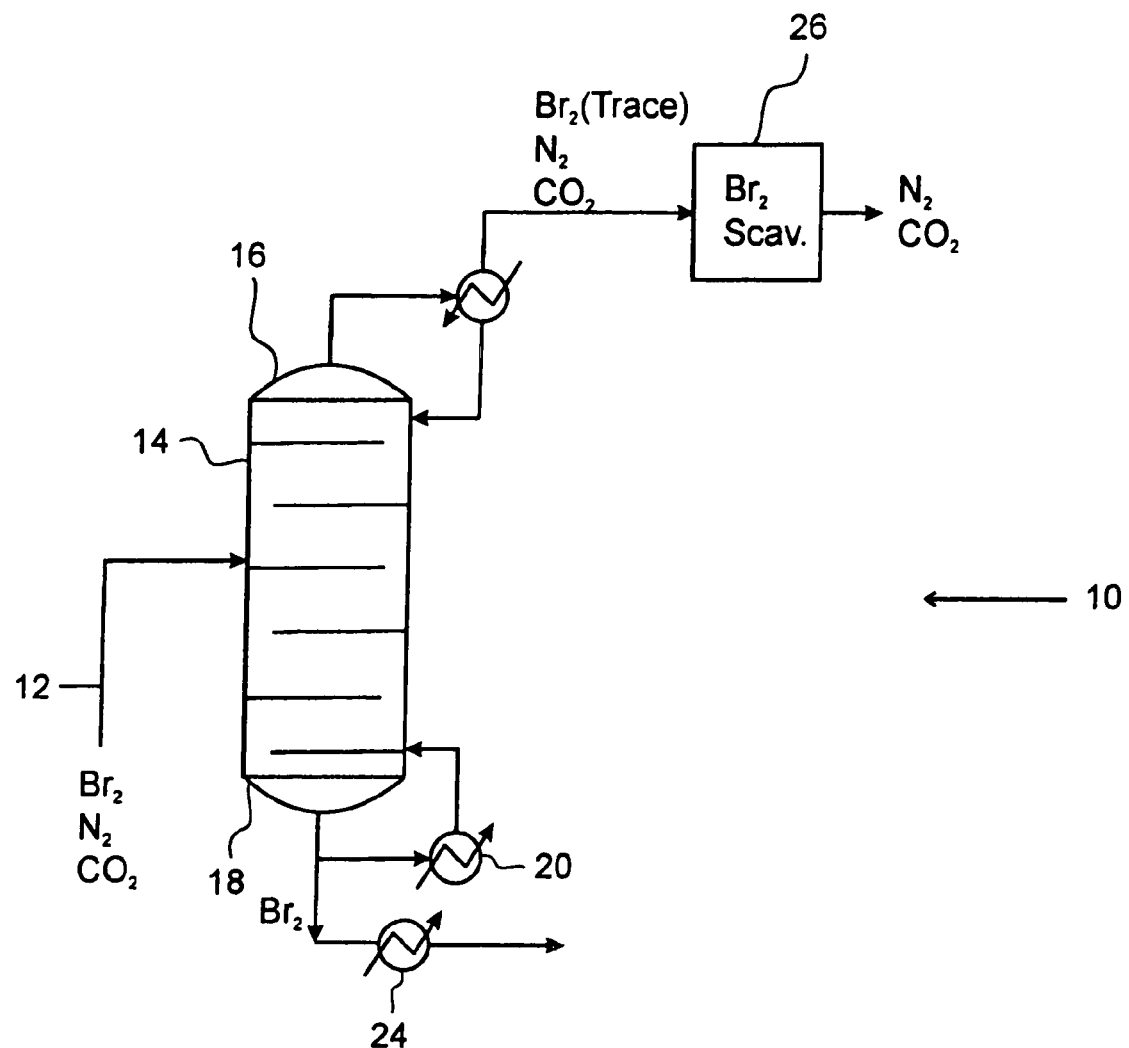
FIG. 1 is a schematic diagram of a process for separating light gases from bromine according to one aspect of the invention.

One embodiment of the present invention is illustrated in FIG. 1, which depicts a system 10 for separating light gases (in this case, nitrogen and carbon dioxide) from bromine. A feed 12 of bromine containing $N_2$ and $CO_2$ is provided to a distillation column 14 having a top 16 and a bottom 18. Heat exchangers 20 and 22 act as partial condenser and total reflux, respectively, allowing a liquid "bottoms" enriched in bromine (and containing no more than a minor amount of light gases—typically, no more than the solubility limit of the two gases in bromine) to be withdrawn from the distillation column, with additional lowering of temperature achieved by heat exchanger 24.

At the top of the column, total reflux of the liquid from the reflux drum is facilitated by heat exchanger 22, yielding a vapor enriched in light gases (and containing no more than a minor amount of bromine), which is routed to a chemical scrubber 26, where the minor amount of bromine is removed, yielding a light gas (nitrogen and carbon dioxide output). As described below, bromine can be recovered from the scrubber by heating it.

In another embodiment of the invention (not shown) two or more distillation columns are connected in series, with the head (vapor) of each column being routed as a feed into the next column, for continual light gas-enrichment of the vapor and bromine-enrichment of the "bottoms" stream from each column.

For a distillation set-up, typical pressures range from 0.1 bar to 50 bar, more preferably 5 to 20 bar, with a temperature dependent on the distillation system pressure, keeping in mind that the normal boiling point of bromine is approximately 59° C. The number of stages can range from 2 to 200, more preferably 5 to 30.

Figure 2:
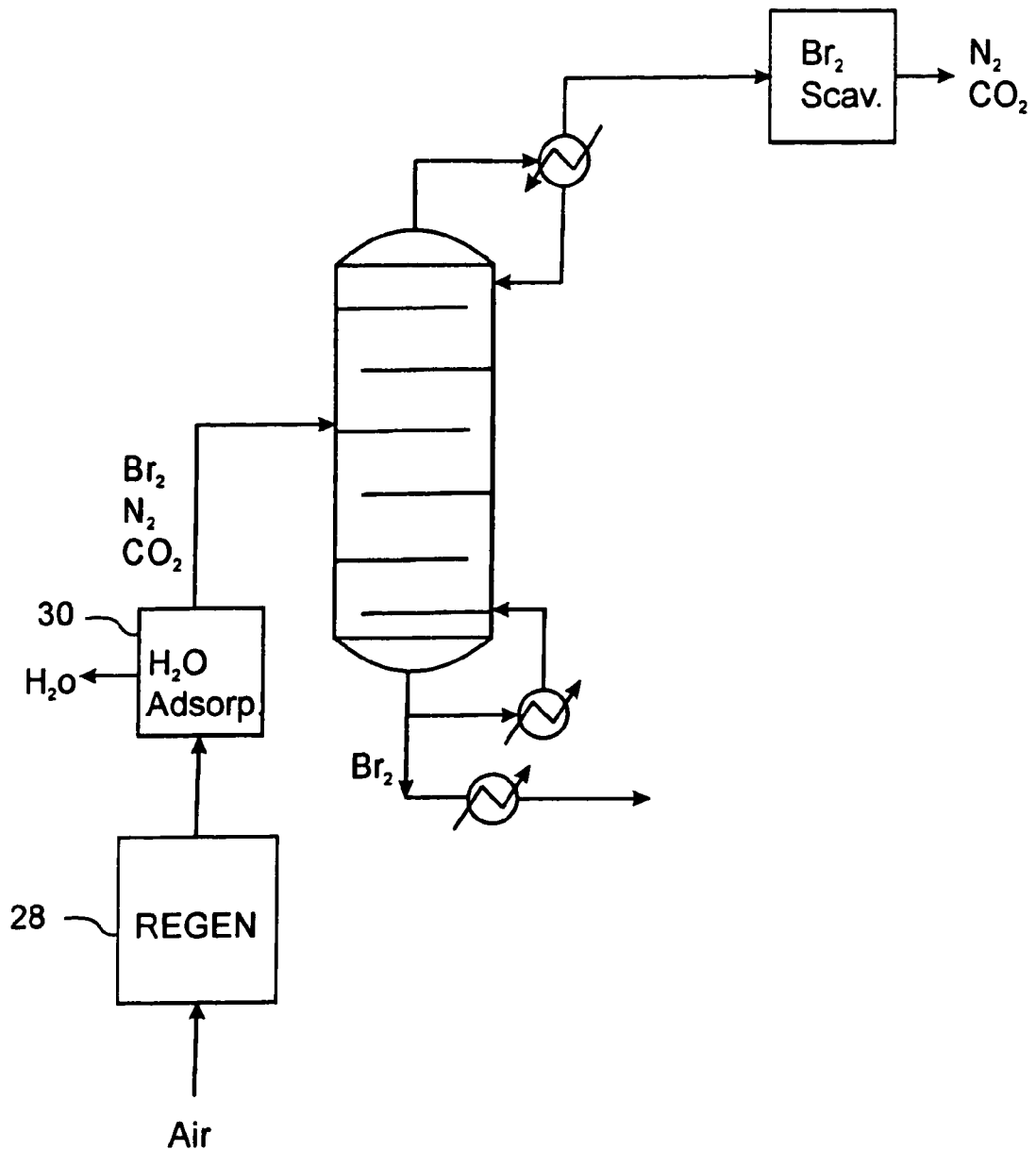
FIG. 2 is a schematic diagram of the process shown in FIG. 1, with the additional elements of bromine formation ("bromine regeneration") and water adsorption.

FIG. 2 illustrates a variation on the embodiment shown in FIG. 2, with the halogen feed (e.g., $Br_2$) coming from a halogen regeneration unit 28. In this embodiment, the halogen feed from 28 contains water, which is removed in a water adsorption unit (containing a desiccant). Alternatively, the feed is first distilled to remove the bromine from the water, up to the limits of the bromine-water azeotrope that forms, with residual water being removed in a water-sorbing column of desiccant.

Figure 3:
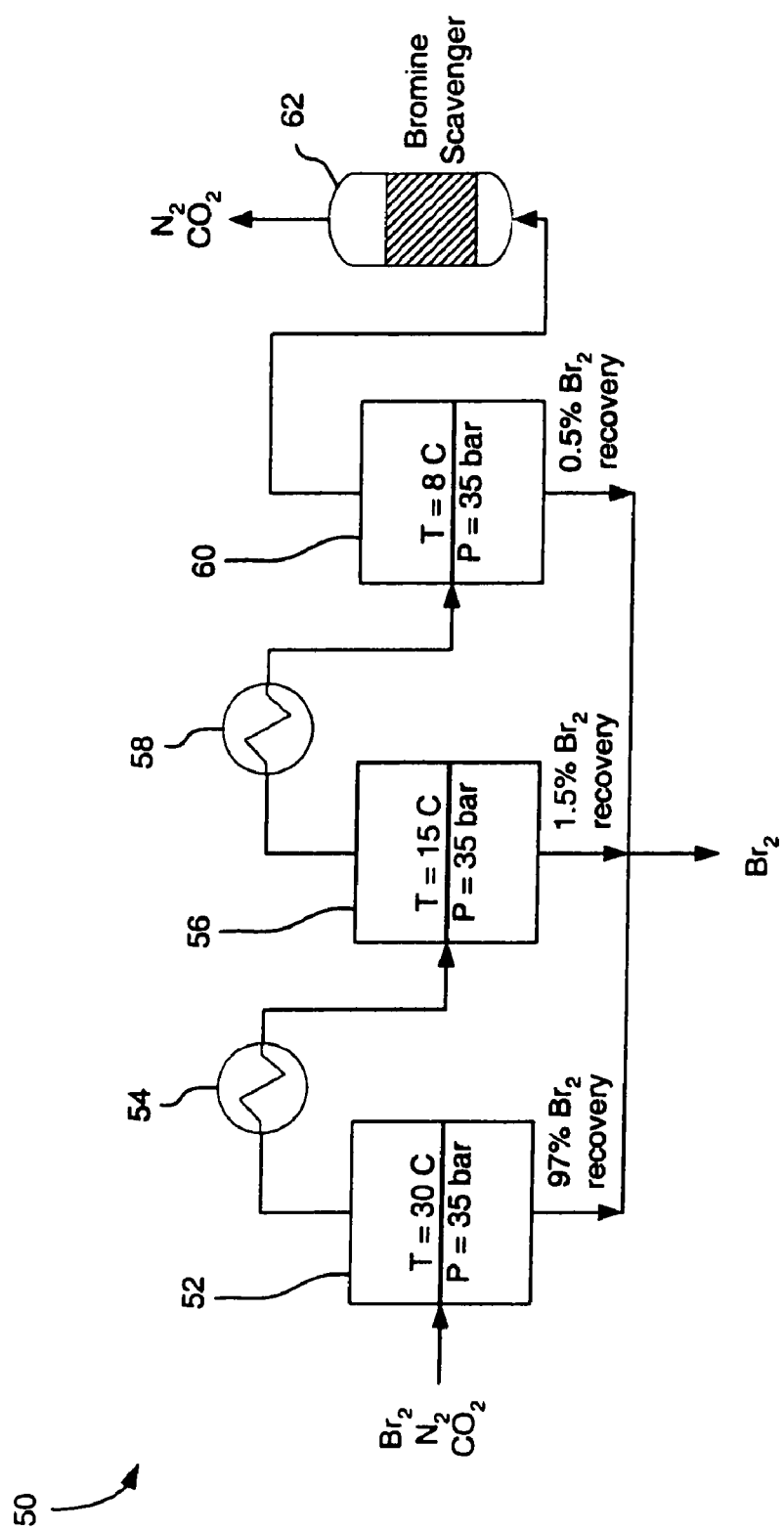
FIG. 3 is a schematic diagram of a process for separating light gas(es) from bromine, utilizing three flash vaporizers run in series, according to another aspect of the invention.
Figure 4:
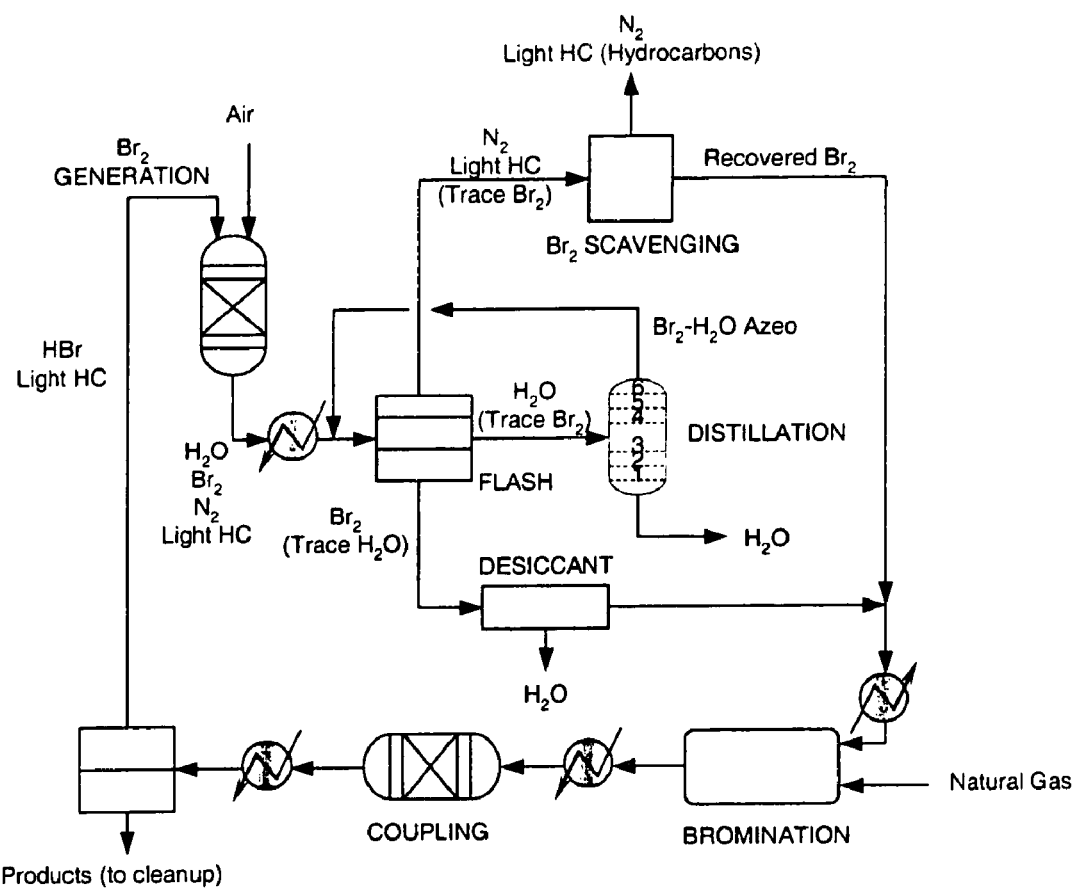
FIG. 4 is a schematic diagram of a continuous process for converting natural gas into higher hydrocarbons and including a subprocess for separating bromine formed during the process from light gases, according to one aspect of the invention.
Figure 5:
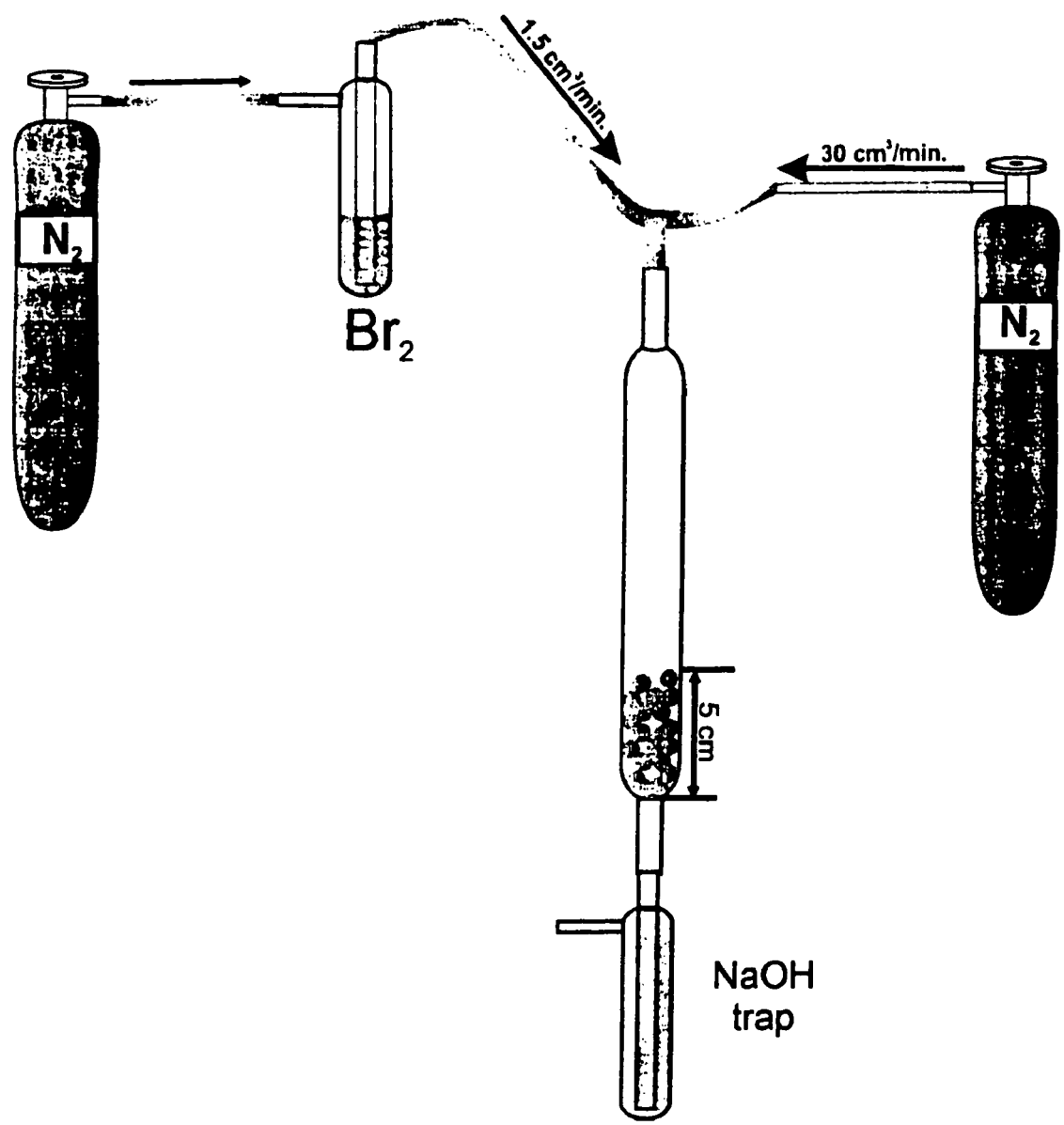
FIG. 5 is a schematic illustration of an experimental method of determining halogen breakthrough in a halogen scavenger used in one embodiment of the invention.

In an alternate embodiment of the invention, one or more vapor-liquid flash separation units ("flash vaporizers") are used to separate the feed of halogen and light gases, followed by additional separation in the chemical scrubber. FIG. 3 illustrates one such a system 50, in which a feed of bromine, containing nitrogen and carbon dioxide, is provided to a first flash vaporizer 52. The contents of the vaporizer are flashed, yielding a first liquid enriched in bromine (e.g., 97% $Br_2$ recovery), and a first light gas-enriched vapor ($N_2$, $CO_2$) containing only a minor amount of bromine. The first vapor is fed to a second flash vaporizer and the contents are flashed, yielding a second bromine-enriched liquid (where, e.g., an additional 1.5% $Br_2$ is recovered) and a second light-gas enriched vapor, which passes through a second heat exchanger 58 and then fed to a third flash vaporizer 60. The contents of the third flash vaporizer are then flashed, yielding, e.g., an additional 0.5% $Br_2$ (liquid) and a vapor very highly enriched in light gases. The trace amount of bromine in this third stream of vapor is removed in a bromine scrubber 62.

If desired, additional flash vaporizes can be utilized. As a practical matter, however, there is a point of diminishing returns (in terms of the amount of additional bromine recovered) beyond which increased capital requirements and operating expenses will likely not be justified.

Mixed systems, employing both distillation column(s) and flash vaporizer(s), can be used.

In general, for the separation of light gases from bromine, each flash vaporizer is operated at a temperature of from −60° C. to 40° C., more preferably −20° C. to 10° C. and a pressure of 0.1 to 50 bar, more preferably 5 to 20 bar, keeping in mind the differences in boiling points between the halogen and the contained light gas(es). One to three flashes are preferred. The pressure can be varied in the flashes; however, to reduce costs, it is desirable to operate the flashes at the system pressure to avoid compression, which is expensive. The temperature for operating the flashes is dependent on the pressure. For example, a high-pressure operation can allow good bromine separation even at modestly high temperatures. For lower pressures, however, a refrigerant may be needed for cooling the flash units. The series of vapor-liquid flashes can consist of one or more flashes.

An important aspect of this invention is the method of chemically scrubbing bromine or chlorine) from a very dilute gas stream consisting mostly of light gases. The method uses a halogen scavenger capable of sorbing halogen. Preferably, the scavenger absorbs bromine vapors from the diluted gas stream and then can reversibly release it back as free bromine, quantitatively. Adsorption of bromine can occur at room or elevated temperature.

In general, any material capable of reacting with bromine and releasing it upon heating can be used as bromine scavenger. Nonlimiting examples of materials considered to be suitable for use as halogen scavengers include CuBr, CuCl, $FeBr_2$, $FeCl_2$, AuCl, AuBr, InBr, InCl, FeO, $Cu_2O$, $Hg_2Br_2$, Cu, Ag, Au, Hg, Pt, Pd, Ru, Rh, Fe, Os, and Ir, used alone or in combination. At present, CuBr is preferred. If copper bromide with high surface area (on a support) is used, much higher activity is observed even though the total mount of copper bromide is much smaller. It has also been found that CuBr made by a precipitation process is better than stock CuBr.

Copper (I) bromide reacts with bromine to form copper (II) bromide according to the following reaction: $2CuBr + Br_2 \rightarrow 2CuBr_2$. The reaction is quick and complete and, advantageously, occurs at low temperatures. The reaction appears to be surface-bound. When using bulk CuBr, approximately 1% of the solid is used before breakthrough occurs. (The density of CuBr and $CuBr_2$ is very similar and the surface does not refresh well; 4.6 versus 4.0 $g/cm^3$). Because the reaction of CuBr with $Br_2$ vapor is a reaction of a gas with a solid, the reaction rate is limited by the solid-gas interface and, correspondingly, the higher the surface area, the higher the reactivity. Indeed, large crystals of neat CuBr are the least effective adsorbent. When breakthrough occurs (Br₂ is no longer retained by the solid), the amount of spent CuBr is approximately 0.2% of the total solid capacity, which means that only the surface of the solid participates in the reaction. The low reaction temperature dismisses the possibility of ion migration and use of the remaining present bulk CuBr.

The ability of CuBr to sorb $Br_2$ at low temperatures is advantageous in part because the inert gas stream (containing a trace amount of bromine) that comes out of the bromine separation is at a low or ambient temperature; therefore, operating the scrubber at or near ambient temperatures requires no additional energy input.

The scrubbed bromine is recovered by regenerating the solid (in this case copper (II) bromide) by heating it to above 250° C., typically from 250° C. to 275° C. The regeneration reaction is: $2CuBr_2(heat) \rightarrow 2CuBr + Br_2$. Where copper bromide is the scavenger, the regeneration is thermally activated and does not require oxygen.

The halogen scavenger can be used as a bulk powder or deposited on a support. Nonlimiting examples include silica, alumina, zirconia, titania, $WO_3$, CaO, MgO, $Cr_2O_3$, and various carbides, nitrides, and similar materials. The primary requirement is that the support have a surface area of from 5 to 1500 $M^2/g$. In our experiments we have used solid Cu(I)Br or Cu(I)Br deposited on Davicat SiZr4700 or Davicat Si1151A (Davidson Corporation), silicas with high surface area (approximately 300 $m^2/g$. Si4700B contains ~3 wt. % $ZrO_2$. Other supports should be equally effective in carrying out the scrubbing reaction over copper bromide.

The halogen scavenger, or scavenger plus support, can be utilized in a packed column reactor configuration or other configurations, such as a shell and tube reactor. Standard heat transfer mediums can be used to deliver the required heat to bring the active ingredients of the scrubber to the regeneration temperature. The process scheme can include two reactors, in which one undergoes scrubbing, while the other one undergoes regeneration.

The solid scrubbing agent is capable of completely retaining all bromine content from the inert gas flow (bromine loss from the scrubber was estimated to be less than 1 ppb). Supported copper (I) bromide shows reproducible results after multiple cycles of exhaustion and regeneration.

When a support (such as silica) is used, the inhomogeneous surface generates nucleation sites which cause the formation of smaller crystallites, with appreciably larger surface area. Even where the supported material contains only 15 wt. % CuBr, its higher CuBr surface area renders it a better material for bromine vapor retention.

To explore the effectiveness of copper (I) bromide as a halogen scavenger, a series of experiments were conducted, using commercially available CuBr, supported CuBr, and CuBr formed by precipitation. The original scavenger (CuBr) was regenerated by heating the $CuBr_2$. Results are presented in Table 1.

TABLE 1

RESULTS OF $Br_2$ SCAVENGING

| Scavenger/Support | Time Exposed to $Br_2$ Vapor | | | |
|---|---|---|---|---|
|  | 10 min. | 20 min. | 40 min. | 80 min. |
| CuBr (commercial) | 100% | 70-75% | not tested | not tested |
| CuBr/Si4700B | not tested | 100% | ~100%* | not tested |

TABLE 1-continued

RESULTS OF $Br_2$ SCAVENGING

| Scavenger/Support | Time Exposed to $Br_2$ Vapor | | | |
|---|---|---|---|---|
|  | 10 min. | 20 min. | 40 min. | 80 min. |
| CuBr/Si1151A | to be tested | to be tested | to be tested | to be tested |
| CuBr, precipitated** | 100% | 100% | 100% | 100% |

Notes:
The % is the amount of total Br retained by the scavenger.
Regeneration is complete at 275° C. within 10-15 min.
Several cycles were tested without diminishing in activity for CuBr/4700B.
*trace of AgBr formed, but the weight measured is <10⁻⁴ g.
**after regeneration its effectiveness diminishes to that of the commercial material.

Figure 6:
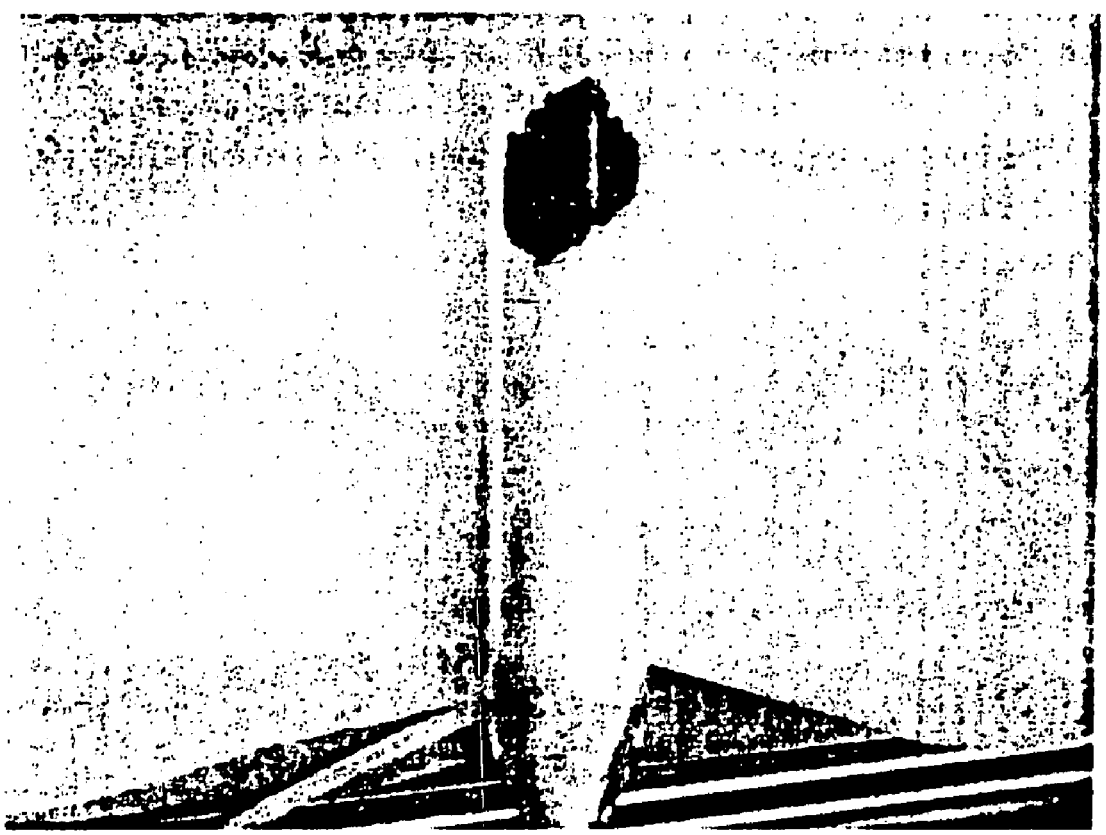
FIG. 6 is a photograph of a tube of CuBr that has been exposed to a bromine/nitrogen stream, according to one aspect of the invention.

FIG. 6 is a photograph of a tube of precipitated CuBr exposed to a bromine/nitrogen stream for thirty minutes at room temperature. The dark material is $CuBr_2$. Upon heating, the color reverses back to the pale green of CuBr, releasing bromine.

Experimental Protocol: 30 sccm/min. $N_2$ mixed with 1.5 sccm $N_2$ going through $Br_2$ bubbler cooled to 0° C. The solid adsorbent bed was contained in a cylindrical glass tube with a diameter of 1 cm. The duration of the exposure to such created diluted bromine in nitrogen was 40 minutes at room temperature. The scrubber treated gas was bubbled through a trap containing 1 M NaOH.

Preparation of the supported CuBr materials: The support was dispersed in a ~20 wt. % $CuBr_2$ solution in water and bubbled with $SO_2$ until the color of the solution became almost colorless. The suspension was filtered and dried at 115° C. overnight.

Regeneration: The regeneration of the retained bromine was conducted by heating the reactor with the solid scrubbing agent after exhaustion at 275° C. for 20 minutes. The released bromine was collected and quantified by capturing the released bromine in a 1M NaOH trap solution. Near complete recovery of the captured bromine is possible.

Quantification: The amount of bromine not retained by the scrubbing agent or regenerated from the exhausted scrubbing agent was quantified by absorption in a NaOH trap, which at the end was acidified with $HNO_3$ until the pH dropped to 5 or below followed by precipitation of AgBr using excess 0.5 M $AgNO_3$ (added until no further precipitation occurred). The amount of the bromine present was calculated from the mass gain of a glass fritted filter used to filter and dry the precipitate of AgBr until its weight does not change.

Bromine breakthrough is determined by using a precipitation of the Br and $BrO^-$ with $Ag^+$, wherein the NaOH trap is acidified with $HNO_3$ until acidic; $AgNo_3$ is added until no more precipitation form; the suspension is allowed to age for 40 minutes then filtered on a dry, pre-weighted glass-fritted funnel, dried until constant weight and the mass difference is AgBr.

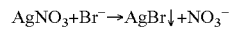

$AgNO_3 + Br^- \rightarrow AgBr\downarrow + NO_3^-$

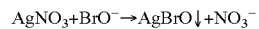

$AgNO_3 + BrO^- \rightarrow AgBrO\downarrow + NO_3^-$

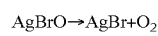

$AgBrO \rightarrow AgBr + O_2$

The solubility constant $K_{sp}$ for AgBr is $5 \times 10^{-13}$ $mol^2 l^{-2}$. The $AgNO_3$ solution is 0.5M-3 ml (or more) added to a total of ~20-25 ml acidified NaOH trap. The final $Ag^+$ concentration is ~0.06M. The lowest detectable concentration of Br— is $~8 \times 10^{-12}$M which corresponds to ~0.6 ppb. Even if a non-ideal case is assumed (high ionic, strength, ion activity different than 1) still the sensitivity is in the ppb range.

EXAMPLE

An inert gas stream of nitrogen at a flow rate of 40 sccm (standard cubic cm per minute) containing approximately 25% bromine by volume was treated according to the method described in the current embodiment. The stream was cooled to a temperature of 25° C., which industrially can be accomplished by using an air-cooled heat exchanger. The stream, which is at a pressure of 25 bar, is then flashed in a single vapor liquid flash unit operating at a temperature of 5° C. The liquid outlet from the flash contains more than 98% of the bromine in the original feed along with some inert gas that is dissolved in the bromine stream. The vapor stream containing the inert gas and trace bromine was then passed over a bed of supported copper (I) bromide at room temperature. The bromine capture from the inert gas stream was complete, and the scrubbing bed performed complete bromine capture for a period of 40 min. The exhausted scrubbing bed containing copper (II) bromide and copper (I) bromide was heated to 275° C., and a near complete bromine recovery was observed in a time period of 15 min.

The invention should find utility in a large number of industrial processes that use halogens as a feedstock or intermediates for chemicals production, where the halogen recovery or purification is improved by the removal of inerts or light gases, resulting in significantly reduced capital and operating costs. Among these are the processes for making alcohols, ethers, olefins, and alkoxylates described in U.S. Pat. Nos. 6,486,368, 6,472,572, 6,472,572, 6,465,696, 6,462, 243, 6,403,840, and processes for making higher hydrocarbons, as described in U.S. patent application Ser. No. 11/703, 358 entitled "Continuous Process for Converting Hydrocarbon Foodstocks into Higher Hydrocarbons and Olefins" filed on even date herewith, the entire contents of which are incorporated herein by this reference. For example, in the process to make gasoline-range hydrocarbons from natural gas, when air is used for regeneration, the nitrogen and carbon dioxide carry forward into the bromination and the metathesis section. To recycle the unconverted methane, separation of nitrogen from methane is required, which is cost-intensive. Also, the carbon dioxide generated during regeneration must be separated from the unconverted methane either using pressure swing adsorption or by using an amine-based system, both of which are cost intensive. The separation of light gases from bromine not only reduces the reactor size but also simplifies the separation of light gases from the products and unconverted reactants. The separation process described herein offers a cost-effective way to separate light gases (including nitrogen and carbon dioxide) from halogens such as bromine.

The invention has been described with various embodiments and examples, but is not limited thereto. Other modifications, as well as equivalents of the appended claims, are within the scope of the invention.

The invention claimed is:

1. A process for separating light gas(es) from bromine, comprising:
   (a) providing a feed of bromine and one or more light gas(es) to a distillation column or flash vaporizer;
   (b) operating the distillation column or flash vaporizer to separate the feed into (i) a first liquid containing a major amount of bromine and no more than a minor amount of the light gas(es), and (ii) a first vapor containing a major amount of the light gas(es) and no more than a minor amount of bromine; and
   (c) providing the first vapor to a chemical scrubber comprising a solid bromine scavenger to recover bromine from the first vapor, wherein the bromine scavenger sorbs the bromine through a chemical reaction with the bromine.

2. A process as recited in claim 1, further comprising providing the first liquid to a distillation column or flash vaporizer to separate the first liquid into (i) a second liquid containing a major amount of bromine and no more than a minor amount of the light gas(es), and (ii) a second vapor containing a major amount of the light gas(es) and no more than a minor amount of bromine; and
   (c) providing the second vapor to a chemical scrubber comprising a bromine scavenger to recover bromine from the second vapor.

3. A process as recited in claim 1, wherein the light gas(es) comprise nitrogen.

4. A process as recited in claim 1, wherein the light gas(es) comprise nitrogen and one or more of additional gas(es) selected from the group consisting of carbon dioxide and a $C_1$-$C_4$ hydrocarbon.

5. A process as recited in claim 1, wherein the bromine scavenger is supported on a support material.

6. A process as recited in claim 1, wherein the bromine scavenger comprises a material selected from the group consisting of CuBr, $FeBr_2$, AuBr, InBr, FeO, $Cu_2O$, $Hg_2Br_2$, Cu, Ag, Au, Hg, Pt, Pd, Ru, Rh, Fe, Os, Ir and mixtures thereof.

7. A process as recited in claim 1, wherein the bromine scavenger comprises CuBr.

8. A process as recited in claim 1, wherein the bromine scavenger is supported on a material selected from the group consisting of metal oxides, metal carbides, metal nitrides, carbon, clay, and mixtures thereof.

9. A process as recited in claim 1, wherein the bromine scavenger is supported on a material selected from the group consisting of $Al_2O_3$, $SiO_2$, $ZrO_2$, $TiO_2$, $WO_3$, CaO, MgO, $Cr_2O$, SiC, $Mo_4C$, TiN, $W_2N$, carbon, zeolite, vermiculite, and mixtures thereof.

10. A process as recited in claim 1, further comprising heating the bromine scavenger to release bromine therefrom.

11. A process for separating light gas(es) from a halogen, comprising:
   (a) providing a feed of a halogen and one or more light gas(es) to a distillation column or flash vaporizer;
   (b) operating the distillation column or flash vaporizer to separate the feed into (i) a first liquid containing a major amount of the halogen and no more than a minor amount of the light gas(es), and (ii) a first vapor containing a major amount of the light gas(es) and no more than a minor amount of the halogen; and
   (c) providing the first vapor to a chemical scrubber comprising a solid halogen scavenger to recover the halogen from the vapor, wherein the halogen scavenger sorbs the halogen through a chemical reaction with the halogen.

12. A process as recited in claim 11, wherein the halogen comprises bromine.

13. A process as recited in claim 11, wherein the halogen scavenger comprises a material selected from the group consisting of $Cu_2O$, Cu, Ag, Au, Hg, Pt, Pd, Ru, Rh, Fe, Os, Ir and mixtures thereof.

14. A process as recited in claim 11, wherein the halogen scavenger comprises a material selected from the group consisting of CuBr, CuCl, $FeBr_2$, $FeCl_2$, AuCl, AuBr, InBr, InCl, FeO, $Hg_2Br_2$, and mixtures thereof.

15. A process as recited in claim 11, wherein the halogen scavenger is supported on a material selected from the group consisting of metal oxides, metal carbides, metal nitrides, carbon, clay, and mixtures thereof.

16. A process as recited in claim 11, wherein the halogen scavenger is supported on a material selected from the group consisting of $Al_2O_3$, $SiO_2$, $ZrO_2$, $TiO_2$, $WO_3$, $CaO$, $MgO$, $Cr_2O$, $SiC$, $Mo_4C$, $TiN$, $W_2N$, carbon, zeolite, vermiculite, and mixtures thereof.

17. A process as recited in claim 11, further comprising heating the halogen scavenger to release the halogen therefrom.

18. A process for separating light gas(es) from a halogen, comprising:
 (a) providing a feed of a halogen and one or more light gas(es) to a distillation column or flash vaporizer, wherein the light gas(es) comprise a $C_1$-$C_4$ hydrocarbon;
 (b) operating the distillation column or flash vaporizer to separate the feed into (i) a first liquid containing a major amount of the halogen and no more than a minor amount of the light gas(es), and (ii) a first vapor containing a major amount of light gas(es) and no more than a minor amount of halogen; and
 (c) providing the first vapor to a chemical scrubber comprising a solid halogen scavenger to recover the halogen from the first vapor, wherein the halogen scavenger sorbs the halogen through a chemical reaction with the halogen.

19. A process as recited in claim 18, wherein the halogen comprises bromine.

20. A process as recited in claim 18, wherein the halogen scavenger comprises a material selected from the group consisting of $CuBr$, $CuCl$, $FeBr_2$, $FeCl_2$, $AuCl$, $AuBr$, $InBr$, $InCl$, $FeO$, $Cu_2O$, $Hg_2Br_2$, $Cu$, $Ag$, $Au$, $Hg$, $Pt$, $Pd$, $Ru$, $Rh$, $Fe$, $Os$, $Ir$ and mixtures thereof.

* * * * *